US011215993B2

(12) United States Patent
Lim

(10) Patent No.: US 11,215,993 B2
(45) Date of Patent: Jan. 4, 2022

(54) METHOD AND DEVICE FOR DATA SHARING USING MEC SERVER IN AUTONOMOUS DRIVING SYSTEM

(71) Applicant: LG ELECTRONICS INC., Seoul (KR)

(72) Inventor: Sunhee Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 193 days.

(21) Appl. No.: 16/588,353

(22) Filed: Sep. 30, 2019

(65) Prior Publication Data

US 2020/0026290 A1 Jan. 23, 2020

(30) Foreign Application Priority Data

Aug. 26, 2019 (KR) ........................ 10-2019-0104705

(51) Int. Cl.
*G05D 1/00* (2006.01)
*H04W 4/40* (2018.01)
*H04B 5/02* (2006.01)

(52) U.S. Cl.
CPC ......... *G05D 1/0088* (2013.01); *G05D 1/0022* (2013.01); *G05D 1/0027* (2013.01); *H04B 5/02* (2013.01); *H04W 4/40* (2018.02)

(58) Field of Classification Search
CPC .. G05D 1/0088; G05D 1/0022; G05D 1/0027; H04W 4/40; H04W 4/06; H04B 5/02; G08G 1/166; G08G 1/22; G08G 1/0112; G08G 1/207; G06Q 50/30; G06Q 30/06; G06Q 10/02; G01C 21/34; H04L 67/2809; H04L 67/32; H04L 2012/40215;
(Continued)

(56) References Cited

U.S. PATENT DOCUMENTS 10,140,784 B1 * 11/2018 Philosof ................. G08G 1/163
2018/0262887 A1 * 9/2018 Futaki ..................... H04W 4/40
(Continued)

FOREIGN PATENT DOCUMENTS

KR 2004-0110210 12/2004
KR 2018-0050449 5/2018
(Continued)

OTHER PUBLICATIONS

KR Office Action in Korean Application No. 1020190104705, dated Jul. 15, 2020, 10 pages.

*Primary Examiner* — Muhammad Shafi
(74) *Attorney, Agent, or Firm* — Fish & Richardson P.C.

(57) ABSTRACT

A method for sharing data using a mobile edge computing (MEC) server in an autonomous driving system includes receiving a first controller area network (CAN) message from a first vehicle, generating a V2X message including information of the first CAN message when autonomous vehicle information is registered in the MEC server, and transmitting the V2X message to an autonomous vehicle connected to the MEC server via broadcast. This allows data to be shared between vehicles using different data types. At least one of an autonomous vehicle, a user terminal, and a server of the present disclosure may be associated with an artificial intelligence module, a drone (Unmannered Aerial Vehicle, UAV) robot, an augmented reality (AR) device, a virtual reality (VR) device, a device related to a 5G service, and the like.

17 Claims, 21 Drawing Sheets

(58) Field of Classification Search
CPC ..... H04L 2012/40273; H04L 12/40039; H04L 67/12
USPC ........................................................ 701/23
See application file for complete search history.

(56) References Cited

U.S. PATENT DOCUMENTS

| | | | | |
|---|---|---|---|---|
| 2019/0028862 | A1* | 1/2019 | Futaki | H04W 92/18 |
| 2019/0090173 | A1* | 3/2019 | Xiao | H04W 4/46 |
| 2019/0387361 | A1* | 12/2019 | Talluri | H04W 64/006 |
| 2020/0105131 | A1* | 4/2020 | Carter | H04W 88/16 |
| 2020/0275246 | A1* | 8/2020 | Croft | H04L 63/102 |
| 2020/0327806 | A1* | 10/2020 | Lekutai | G08G 1/096716 |

FOREIGN PATENT DOCUMENTS

| | | |
|---|---|---|
| KR | 2018-0113624 | 10/2018 |
| KR | 2019-0086408 | 7/2019 |

* cited by examiner

FIG. 12
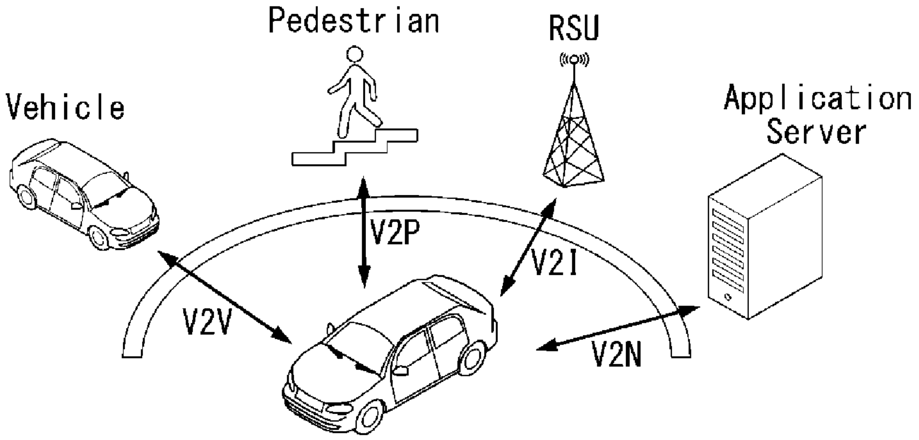
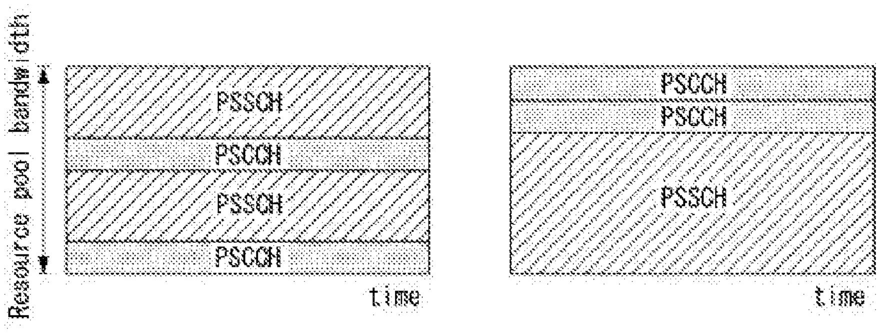
FIG. 13A
FIG. 13B

[CAN ID PER OEM]

| identifier | Honda | Hyundai | Etc |
|---|---|---|---|
| VIN | ENG_40C | - | v.s.id |
| GPS | - | 0x0177 | v.s.id |
| Speed | EAT_158 | 0x8610 | v.s.id |
| Break on/off | ENG_17C | - | v.s.id |
| Turn Signal | AF87018 | - | v.s.id |

[CAN Data Info PER OEM]

| data | Honda | Hyundai | Etc |
|---|---|---|---|
| VIN | 8f40cabe2 | v.s.data | v.s.data |
| GPS | - | v.s.data | v.s.data |
| Speed | 0~655.35 | v.s.data | v.s.data |
| Break on/off | 0/1 | v.s.data | v.s.data |
| Turn Signal | 0/1 | v.s.data | v.s.data |

v.s.id : vendor specific ID
v.s.data : vendor specific Data

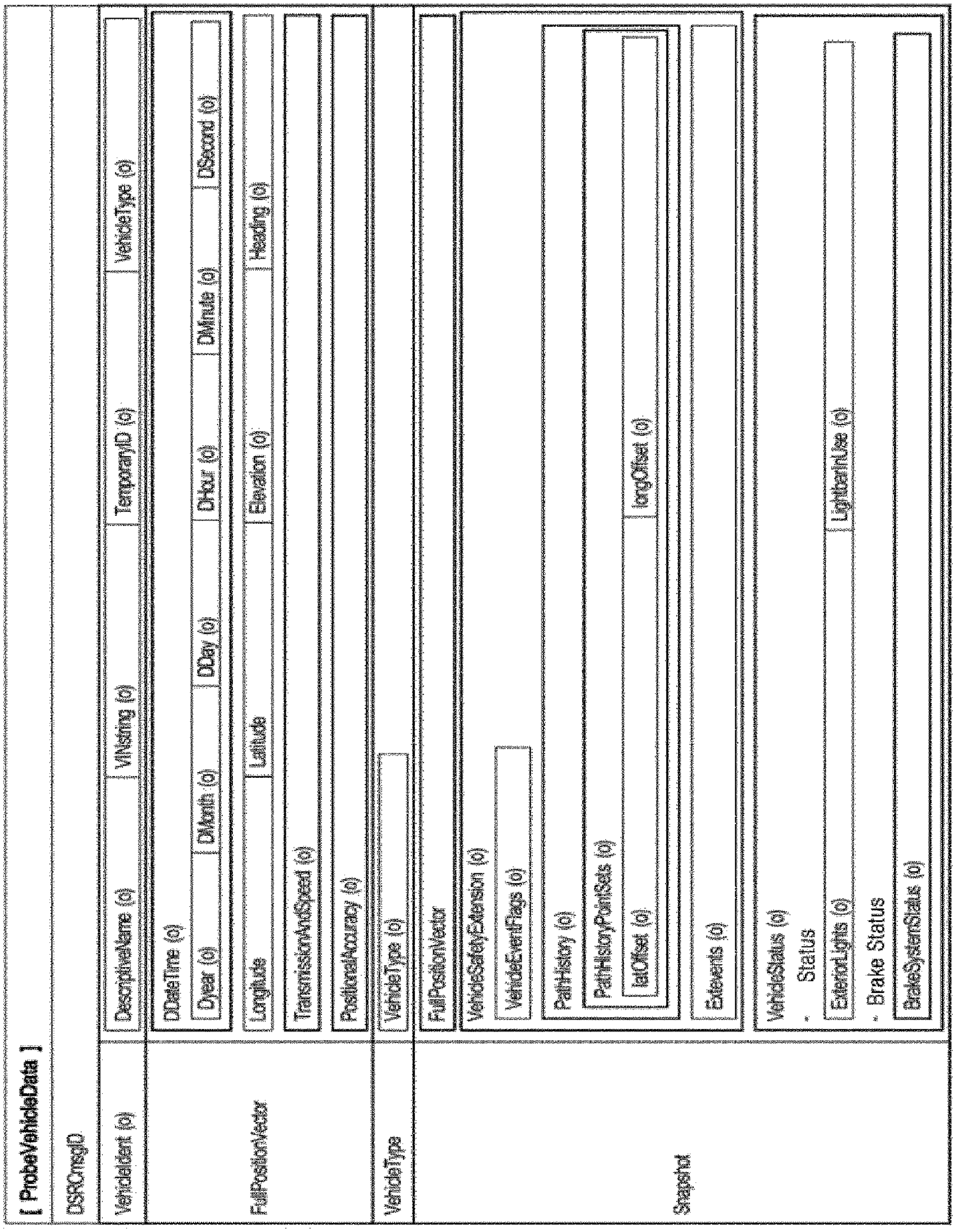

FIG. 19

| [ ProbeVehicleData ] | | | | | | | | |
|---|---|---|---|---|---|---|---|---|
| DSRCmsgID | | | | | | | | |
| VehicleIdent (o) | DescriptiveName (o) | VINstring (o) | | | TemporaryID (o) | | VehicleType (o) | |
| | DDateTime (o) | | | | | | | |
| | DYear (o) | DMonth (o) | DDay (o) | DHour (o) | DMinute (o) | DSecond (o) | | |
| FullPositionVector | Longitude | | Latitude | Elevation (o) | | Heading (o) | | |
| | TransmissionAndSpeed (o) | | | | | | | |
| | PositionalAccuracy (o) | | | | | | | |
| VehicleType | VehicleType (o) | | | | | | | |
| | FullPositionVector | | | | | | | |
| | VehicleSafetyExtension (o) | | | | | | | |
| | VehicleEventFlags (o) | | | | | | | |
| | PathHistory (o) | | | | | | | |
| | PathHistoryPointSets (o) | | | | | | | |
| | latOffset (o) | | | longOffset (o) | | | | |
| Snapshot | Extevents (o) | | | | | | | |
| | VehicleStatus (o) | | | | | | | |
| | . Status | | | | | | | |
| | ExteriorLights (o) | | | | | LightbarInUse (o) | | |
| | - Brake Status | | | | | | | |
| | BrakeSystemStatus (o) | | | | | | | |

METHOD AND DEVICE FOR DATA SHARING USING MEC SERVER IN AUTONOMOUS DRIVING SYSTEM

CROSS-REFERENCE TO RELATED APPLICATION

This application claims the benefit of Korean Patent Application No. 10-2019-0104705, filed on Aug. 26, 2019. The contents of this application are hereby incorporated by reference in its entirety.

BACKGROUND OF THE INVENTION

Field of the Invention

The present disclosure relates to an autonomous driving system, and to, a method and a device for sharing data between an autonomous vehicle and a non-autonomous vehicle using a MEC server.

Related Art

Vehicles may be classified into an internal combustion engine vehicle, an external composition engine vehicle, a gas turbine vehicle, an electric vehicle, etc. According to types of motors used therefor.

An autonomous vehicle refers to a self-driving vehicle that may travel without an operation of a driver or a passenger, and automated vehicle & highway systems refer to systems that monitor and control the autonomous vehicle such that the autonomous vehicle may perform self-driving.

SUMMARY OF THE INVENTION

A purpose of the present disclosure is to propose a method and a device for sharing data between an autonomous vehicle and a non-autonomous vehicle using a MEC server in an autonomous driving system.

In addition, another purpose of the present disclosure is to propose a method for processing data based on a delay time when sharing data in an autonomous driving system.

The technical problems to be solved by the present disclosure are not limited to the technical problems mentioned above. Other technical problems that are not mentioned will be clearly understood by those skilled in the art to which the present disclosure belongs from a following detailed description.

In a first aspect, a method for sharing data using a mobile edge computing (MEC) server in an autonomous driving system is provided. The method includes receiving a first controller area network (CAN) message from a first vehicle, generating a V2X message including information of the first CAN message when autonomous vehicle information is registered in the MEC server, and transmitting the V2X message to an autonomous vehicle connected to the MEC server via broadcast.

In one implementation, the method may further include generating a second CAN message including the information of the first CAN message when information of a vendor other than a vendor of the first vehicle is registered in the MEC server, and transmitting the second CAN message to a second vehicle associated with the vendor information via the broadcast, wherein the second CAN message may be associated with the vendor information.

In one implementation, the method of claim may further include receiving the autonomous vehicle information from the autonomous vehicle, and registering the autonomous vehicle information.

In one implementation, the method may further include receiving vendor information of the second vehicle from the second vehicle, and registering the vendor information of the second vehicle.

In one implementation, the V2X message may include a value of a time at which the first CAN message is received.

In one implementation, the second CAN message may include a value of a time at which the first CAN message is received.

In one implementation, the autonomous vehicle may correct position information included in the V2X message based on the value of the time.

In one implementation, the second vehicle may correct position information included in the second CAN message based on the value of the time.

In a second aspect, a method for sharing data using a mobile edge computing (MEC) server in an autonomous driving system is provided. The method includes receiving a V2X message from an autonomous vehicle, generating a controller area network (CAN) message including information of the V2X message when vendor information of a vehicle is registered in the MEC server, and transmitting the CAN message to the vehicle connected to the MEC server via broadcast.

In one implementation, the method may further include receiving the vendor information of the vehicle from the vehicle, and registering the vendor information of the vehicle.

In one implementation, the CAN message may include a value of a time at which the V2X message is generated.

In one implementation, the vehicle may correct a position of the autonomous vehicle based on the value of the time.

In a third aspect, a mobile edge computing (MEC) server for sharing data in an autonomous driving system is provided. The MEC server includes a communication module, a memory, and a processor. The processor receives a first controller area network (CAN) message from a first vehicle via the communication module, generates a V2X message including information of the first CAN message when autonomous vehicle information is registered in the memory, and transmits the V2X message to an autonomous vehicle connected to the MEC server via broadcast via the communication module.

According to one embodiment of the present disclosure, the method and the device for sharing the data between the autonomous vehicle and the non-autonomous vehicle using the MEC server in the autonomous driving system may be provided.

Further, according to one embodiment of the present disclosure, the method for processing the data based on the delay time when sharing the data in the autonomous driving system may be performed.

The effects that may be obtained in the present disclosure are not limited to the above-mentioned effects, and other effects not mentioned will be clearly understood by those skilled in the art to which the present disclosure belongs from a following description.

BRIEF DESCRIPTION OF THE DRAWINGS

FIG. 12 is a view illustrating V2X communication to which the present disclosure may be applied.

FIGS. 13A and 13B illustrate a resource allocation method in sidelink in which V2X is used.

FIG. 19 is an example of a PVD to which the present disclosure may be applied.

The accompanying drawings, which are included as part of the detailed description to help understand the present disclosure, provide an embodiment of the present disclosure and, together with the detailed description, describe the technical features of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
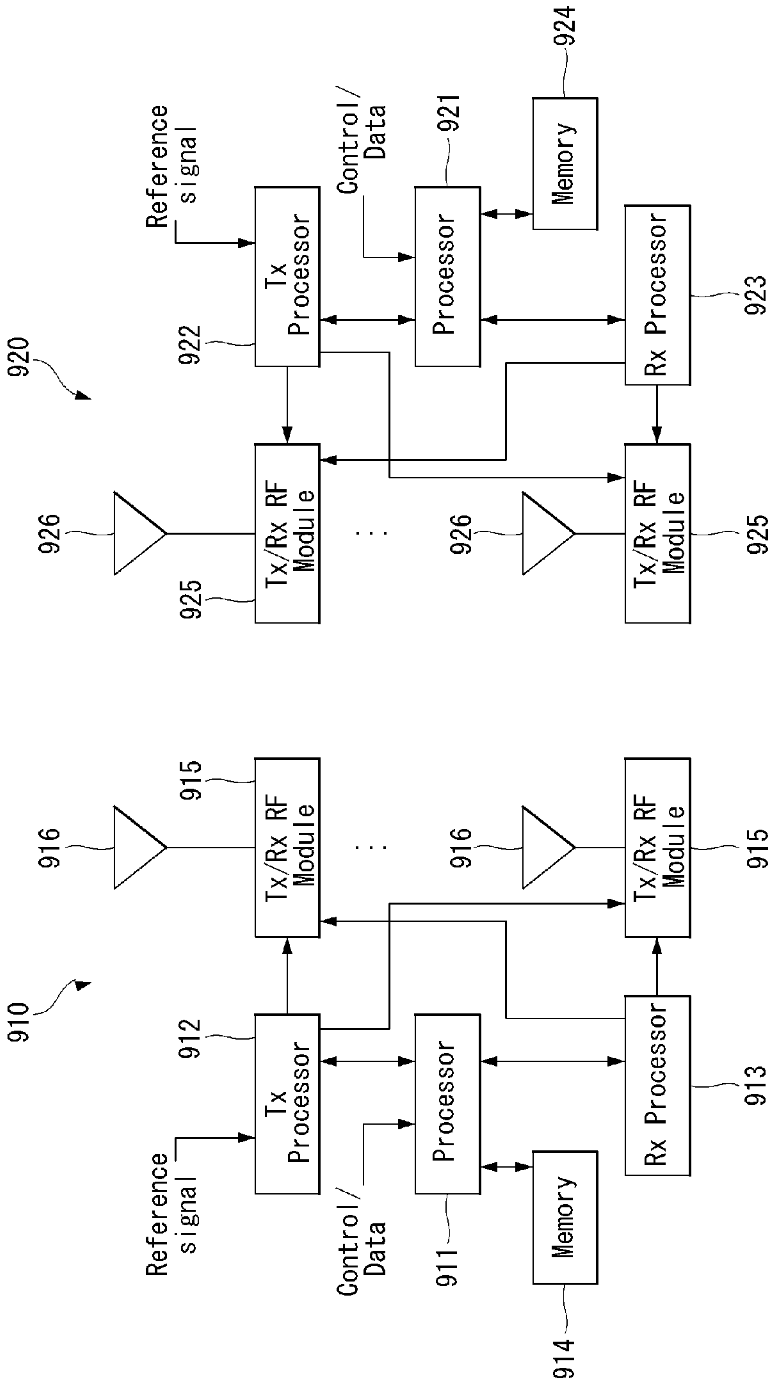
FIG. 1 is a block diagram of a wireless communication system to which the methods proposed herein may be applied.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 may perform detailed autonomous operations.

A 5G network including another vehicle communicating with the autonomous device is defined as a second communication device (920 of FIG. 1), and a processor 921 may perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
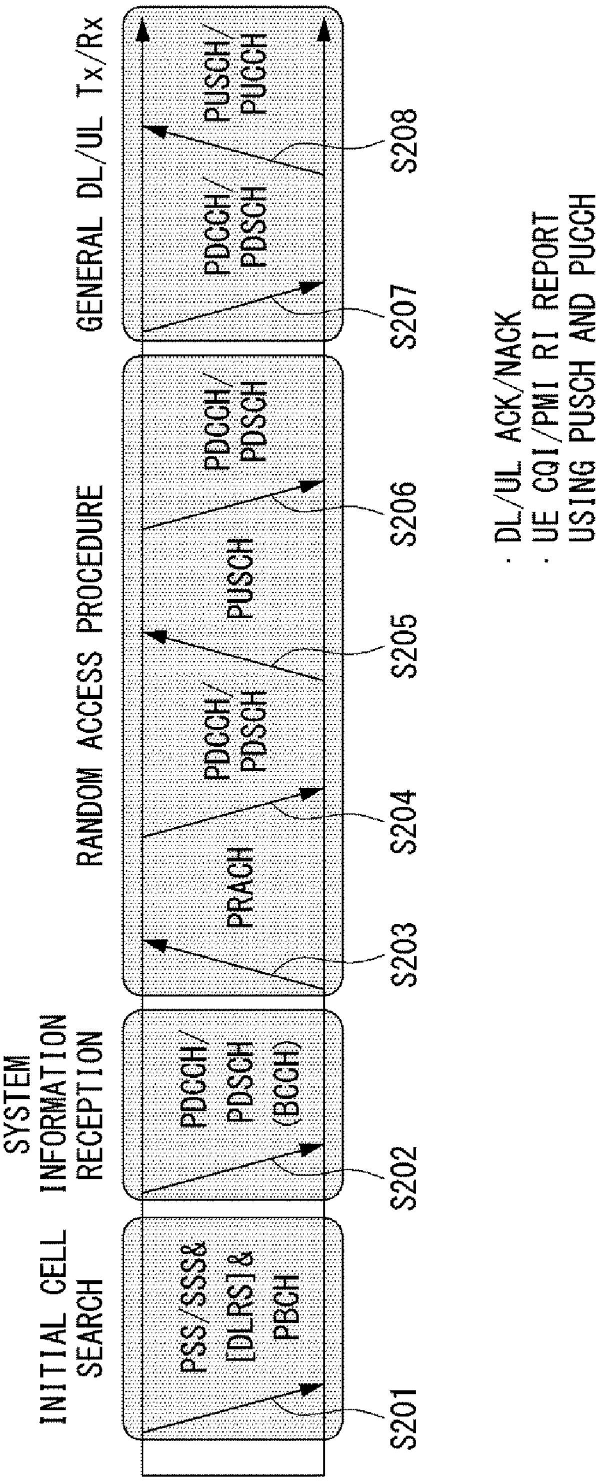
FIG. 2 shows an example of a signal transmitting/receiving method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE may receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE may acquire broadcast information in the cell by receiving a physical broadcast channel (PBCH) from the BS. Further, the UE may receive a downlink reference signal (DL RS) in the initial cell search step to check a downlink channel state. After initial cell search, the UE may acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE may perform a random access procedure (RACH) for the BS (steps S203 to S206). To this end, the UE may transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE may perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network may configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH may be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE may perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure may be used for network initial access, handover, and UE-triggered UL data transmission. A UE may acquire UL synchronization and UL transmission resources through the random access procedure. The random access procedure is classified into a contention-based random access procedure and a contention-free random access procedure. A detailed procedure for the contention-based random access procedure is as follows.

A UE may transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE may receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE may be determined according to presence or absence of a random access preamble ID with respect to the preamble transmitted by the UE. If there is no response to Msg1, the UE may retransmit the RACH preamble less than a predetermined number of times while performing power ramping. The UE calculates PRACH transmission power for preamble retransmission on the basis of most recent pathloss and a power ramping counter.

The UE may perform UL transmission through Msg3 of the random access procedure over a physical uplink shared channel on the basis of the random access response information. Msg3 may include an RRC connection request and a UE ID. The network may transmit Msg4 as a response to Msg3, and Msg4 may be handled as a contention resolution message on DL. The UE may enter an RRC connected state by receiving Msg4.

C. Beam Management (BM) Procedure of 5G Communication System

ABM procedure may be divided into (1) a DL MB procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set may be set as {SSBx1, SSBx2, SSBx3, SSBx4, . . . }. An SSB index may be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE may assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam may be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE may skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and may be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR may refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services may be scheduled on non-overlapping time/frequency resources, and URLLC transmission may occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE may assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information may be transmitted/received through a narrowband (e.g., 6 resource blocks (RBs) or 1 RB).

F. Basic Operation Between Autonomous Vehicles Using 5G Communication

Figure 3:
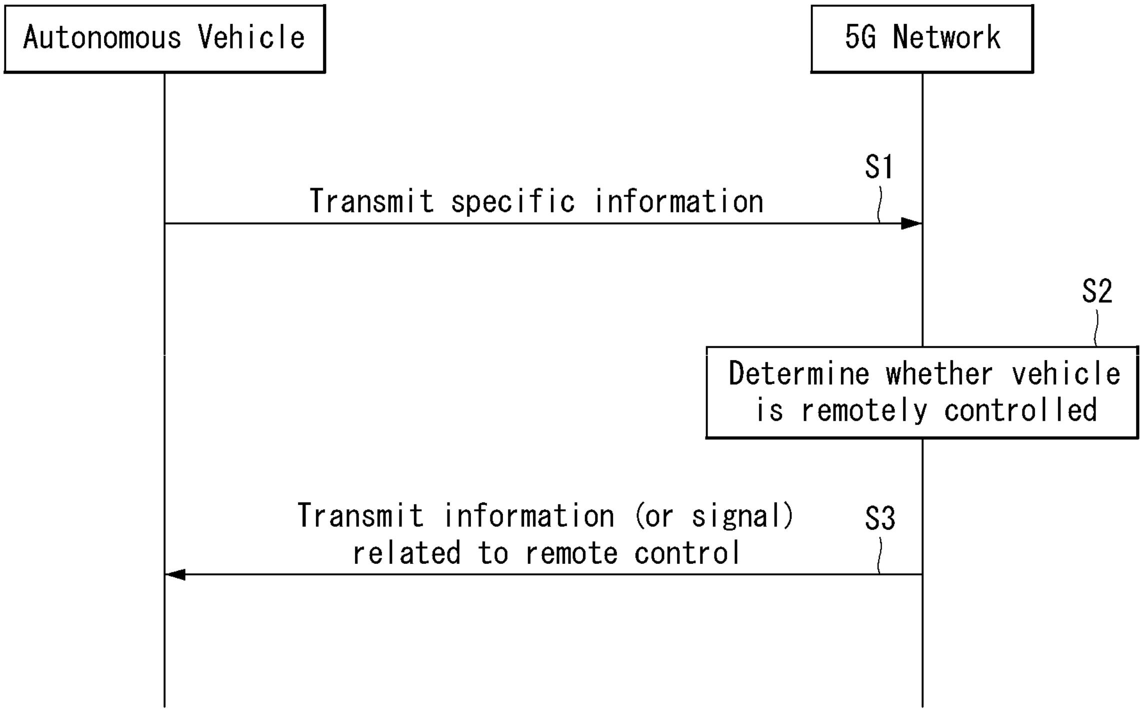
FIG. 3 illustrates an example of a basic operation of an autonomous vehicle and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network may determine whether to remotely control the vehicle (S2). Here, the 5G network may include a server or a module which performs remote control related to autonomous driving. In addition, the 5G network may transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network may transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network may transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle may receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle may receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information may be transmitted through a narrowband of 6 resource blocks (RBs) or 1 RB.

H. Autonomous Driving Operation Between Vehicles Using 5G Communication

Figure 4:
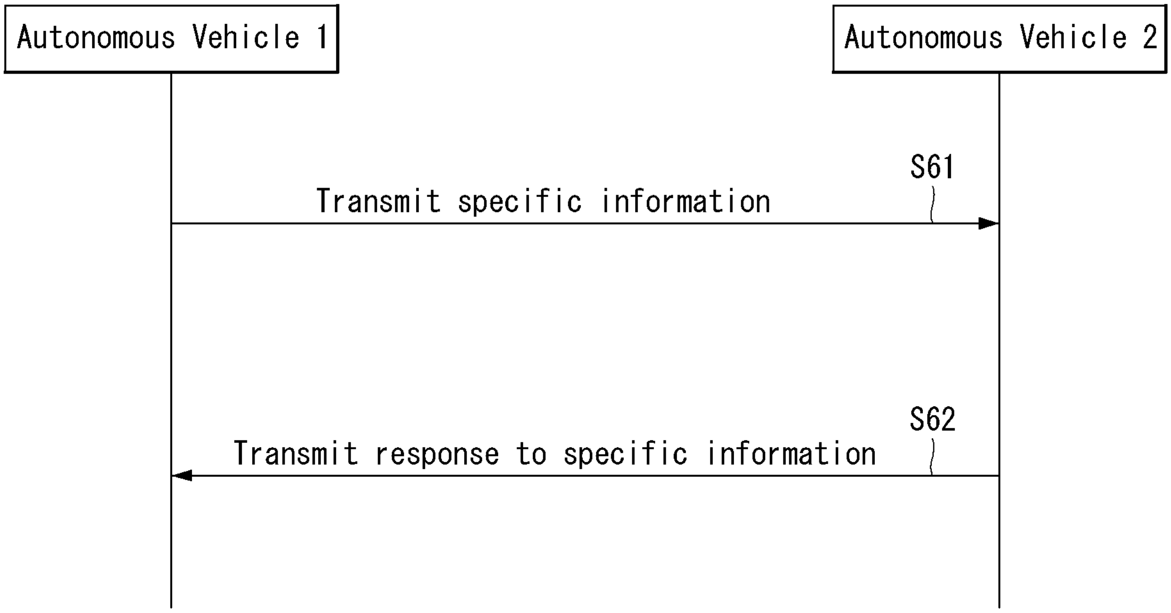
FIG. 4 shows an example of a basic operation between a vehicle and a vehicle using 5G communication.

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network may transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology may be combined with methods proposed in the present disclosure which will be described later and applied or may complement the methods proposed in the present disclosure to make technical features of the methods concrete and clear.

Driving (1) Exterior of Vehicle

Figure 5:
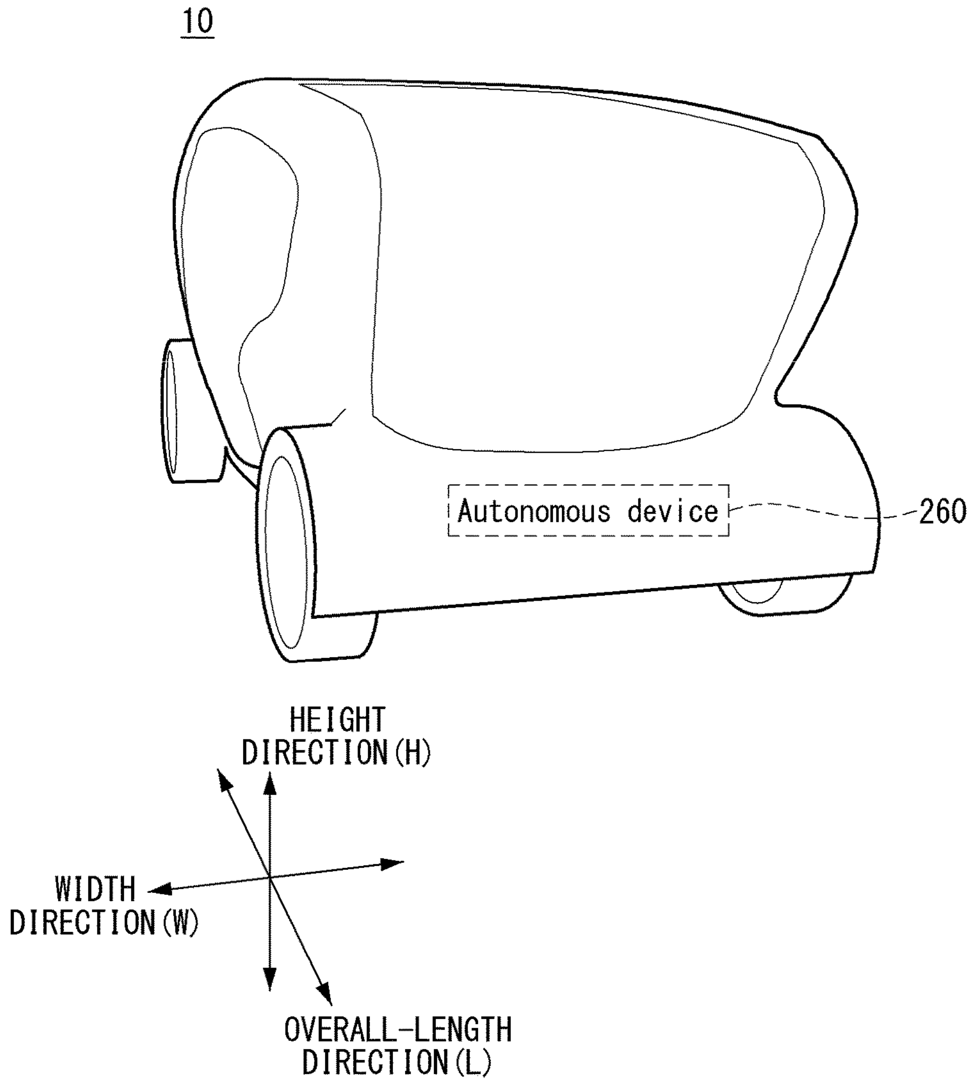
FIG. 5 is a diagram illustrating a vehicle according to an embodiment of the present disclosure.

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
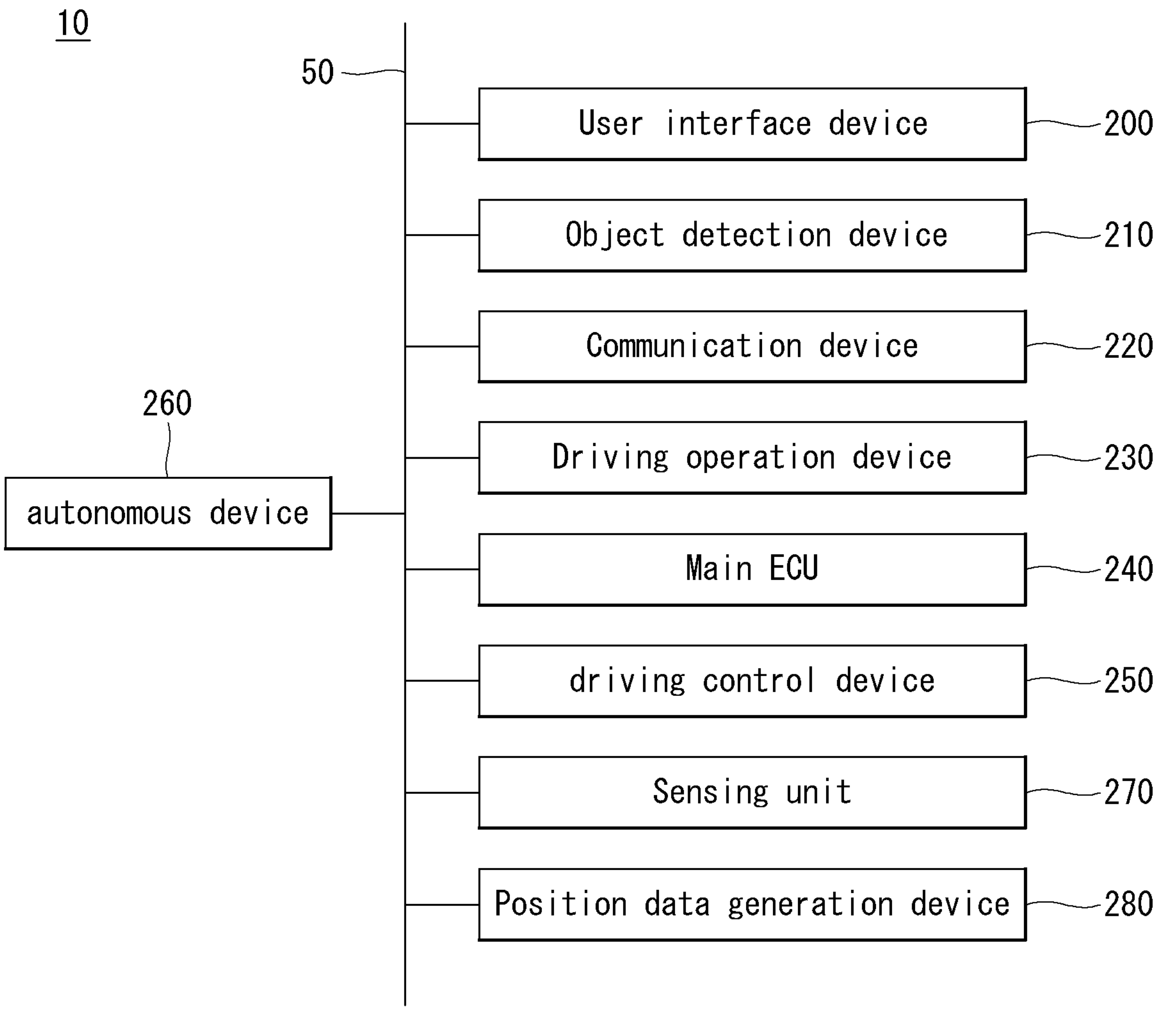
FIG. 6 is a control block diagram of a vehicle according to an embodiment of the present disclosure.

FIG. 6 is a control block diagram of the vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 may receive user input and provide information generated in the vehicle 10 to the user. The vehicle 10 may realize a user interface (UI) or user experience (UX) through the user interface device 200. The user interface device 200 may include an input device, an output device and a user monitoring device.

2) Object Detection Device

The object detection device 210 may generate information about objects outside the vehicle 10. Information about an object may include at least one of information on presence or absence of the object, positional information of the object, information on a distance between the vehicle 10 and the object, and information on a relative speed of the vehicle 10 with respect to the object. The object detection device 210 may detect objects outside the vehicle 10. The object detection device 210 may include at least one sensor which may detect objects outside the vehicle 10. The object detection device 210 may include at least one of a camera, a radar, a lidar, an ultrasonic sensor and an infrared sensor. The object detection device 210 may provide data about an object generated on the basis of a sensing signal generated from a sensor to at least one electronic device included in the vehicle.

2.1) Camera

The camera may generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera may acquire positional information of objects, information on distances to objects, or information on relative speeds with respect to objects using various image processing algorithms. For example, the camera may acquire information on a distance to an object and information on a relative speed with respect to the object from an obtained image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image obtained from a stereo camera on the basis of disparity information.

The camera may be attached at a portion of the vehicle at which FOV (field of view) may be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar may generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar may detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3 Lidar

The lidar may generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar may detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 may exchange signals with devices disposed outside the vehicle 10. The communication device 220 may exchange signals with at least one of infrastructure (e.g., a server and a broadcast station), another vehicle and a terminal. The communication device 220 may include a transmission antenna, a reception antenna, and at least one of a radio frequency (RF) circuit and an RF element which may implement various communication protocols in order to perform communication.

For example, the communication device may exchange signals with external devices on the basis of C-V2X (Cellular V2X). For example, C-V2X may include sidelink communication on the basis of LTE and/or sidelink communication on the basis of NR. Details related to C-V2X will be described later.

For example, the communication device may exchange signals with external devices on the basis of DSRC (Dedicated Short Range Communications) or WAVE (Wireless Access in Vehicular Environment) standards on the basis of IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure may exchange signals with external devices using only one of C-V2X and DSRC. Alternatively, the communication device of the present disclosure may exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 may control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 may control vehicle driving devices on the basis of signals received by the autonomous device 260. For example, the driving control device 250 may control a power train, a steering device and a brake device on the basis of signals received by the autonomous device 260.

7) Autonomous Device

The autonomous device 260 may generate a route for self-driving on the basis of obtained data. The autonomous device 260 may generate a driving plan for traveling along the generated route. The autonomous device 260 may generate a signal for controlling movement of the vehicle according to the driving plan. The autonomous device 260 may provide the signal to the driving control device 250.

The autonomous device 260 may implement at least one ADAS (Advanced Driver Assistance System) function. The ADAS may implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 may perform switching from a self-driving mode to a manual driving mode or switching from the manual driving mode to the self-driving mode. For example, the autonomous device 260 may switch the mode of the vehicle 10 from the self-driving mode to the manual driving mode or from the manual driving mode to the self-driving mode on the basis of a signal received from the user interface device 200.

8) Sensing Unit

The sensing unit 270 may detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 may generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 may generate position data of the vehicle 10. The position data generation device 280 may include at least one of a global positioning system (GPS) and a differential global positioning system (DGPS). The position data generation device 280 may generate position data of the vehicle 10 on the basis of a signal generated from at least one of the GPS and the DGPS. According to an embodiment, the position data generation device 280 may correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

(3) Components of Autonomous Device

Figure 7:
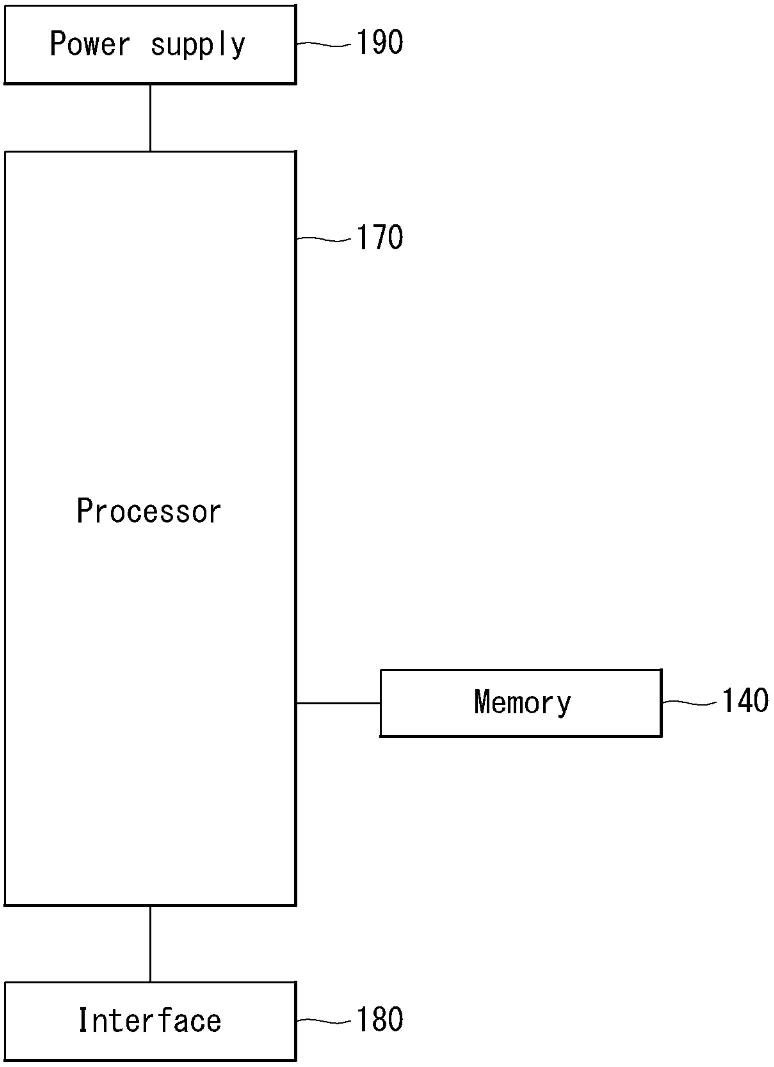
FIG. 7 is a control block diagram of an autonomous vehicle according to an embodiment of the present disclosure.

FIG. 7 is a control block diagram of the autonomous device according to an embodiment of the present disclosure.

Referring to FIG. 7, the autonomous device 260 may include a memory 140, a processor 170, an interface 180 and a power supply 190.

The memory 140 is electrically connected to the processor 170. The memory 140 may store basic data with respect to units, control data for operation control of units, and input/output data. The memory 140 may store data processed in the processor 170. Hardware-wise, the memory 140 may be configured as at least one of a ROM, a RAM, an EPROM, a flash drive and a hard drive. The memory 140 may store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 may exchange signals with at least one electronic device included in the vehicle 10 in a wired or wireless manner. The interface 180 may exchange signals with at least one of the object detection device 210, the communication device 220, the driving operation device 230, the main ECU 240, the driving control device 250, the sensing unit 270 and the position data generation device 280 in a wired or wireless manner. The interface 180 may be configured using at least one of a communication module, a terminal, a pin, a cable, a port, a circuit, an element and a device.

The power supply 190 may provide power to the autonomous device 260. The power supply 190 may be provided with power from a power source (e.g., a battery) included in the vehicle 10 and supply the power to each unit of the autonomous device 260. The power supply 190 may operate according to a control signal supplied from the main ECU 240. The power supply 190 may include a switched-mode power supply (SMPS).

The processor 170 may be electrically connected to the memory 140, the interface 180 and the power supply 190 and exchange signals with these components. The processor 170 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 may be operated by power supplied from the power supply 190. The processor 170 may receive data, process the data, generate a signal and provide the signal while power is supplied thereto.

The processor 170 may receive information from other electronic devices included in the vehicle 10 through the interface 180. The processor 170 may provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 8:
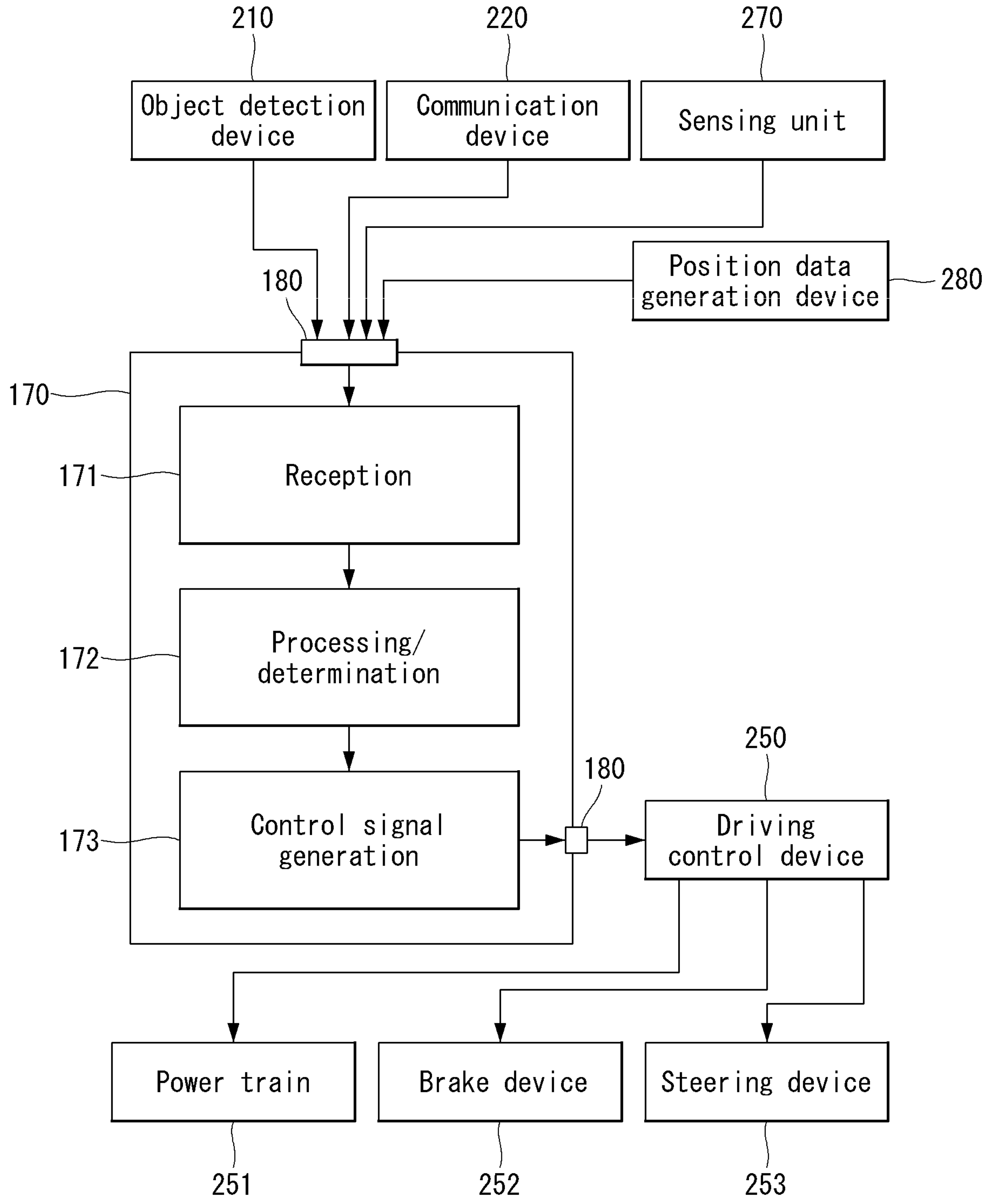
FIG. 8 is a signal flowchart of an autonomous vehicle according to an embodiment of the present disclosure.

FIG. 8 is a diagram showing a signal flow in an autonomous vehicle according to an embodiment of the present disclosure.

1) Reception Operation

Referring to FIG. 8, the processor 170 may perform a reception operation. The processor 170 may receive data from at least one of the object detection device 210, the communication device 220, the sensing unit 270 and the position data generation device 280 through the interface 180. The processor 170 may receive object data from the object detection device 210. The processor 170 may receive HD map data from the communication device 220. The processor 170 may receive vehicle state data from the sensing unit 270. The processor 170 may receive position data from the position data generation device 280.

2) Processing/Determination Operation

The processor 170 may perform a processing/determination operation. The processor 170 may perform the processing/determination operation on the basis of traveling situation information. The processor 170 may perform the processing/determination operation on the basis of at least one of object data, HD map data, vehicle state data and position data.

2.1) Driving Plan Data Generation Operation

The processor 170 may generate driving plan data. For example, the processor 170 may generate electronic horizon data. The electronic horizon data may be understood as driving plan data in a range from a position at which the vehicle 10 is located to a horizon. The horizon may be understood as a point a predetermined distance before the position at which the vehicle 10 is located on the basis of a predetermined traveling route. The horizon may refer to a point at which the vehicle may arrive after a predetermined time from the position at which the vehicle 10 is located along a predetermined traveling route.

The electronic horizon data may include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be on the basis of data stored in at least one memory included in the vehicle 10.

The road data may include at least one of road slope data, road curvature data and road speed limit data. The road data may further include no-passing zone data. The road data may be on the basis of data received from an external server through the communication device 220. The road data may be on the basis of data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be on the basis of data received from an external server through the communication device 220.

The dynamic data may include various types of dynamic information which may be generated on roads. For example, the dynamic data may include construction information, variable speed road information, road condition information, traffic information, moving object information, etc. The dynamic data may be on the basis of data received from an external server through the communication device 220. The dynamic data may be on the basis of data generated in the object detection device 210.

The processor 170 may provide map data in a range from a position at which the vehicle 10 is located to the horizon.

2.1.2) Horizon Path Data

The horizon path data may be explained as a trajectory through which the vehicle 10 may travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road may be calculated to be higher than a probability of selecting the second road.

The horizon path data may include a main path and a sub-path. The main path may be understood as a trajectory obtained by connecting roads having a high relative probability of being selected. The sub-path may be branched from at least one decision point on the main path. The sub-path may be understood as a trajectory obtained by connecting at least one road having a low relative probability of being selected at at least one decision point on the main path.

3) Control Signal Generation Operation

The processor 170 may perform a control signal generation operation. The processor 170 may generate a control signal on the basis of the electronic horizon data. For example, the processor 170 may generate at least one of a power train control signal, a brake device control signal and a steering device control signal on the basis of the electronic horizon data.

The processor 170 may transmit the generated control signal to the driving control device 250 through the interface 180. The driving control device 250 may transmit the control signal to at least one of a power train 251, a brake device 252 and a steering device 254.

Cabin

Figure 9:
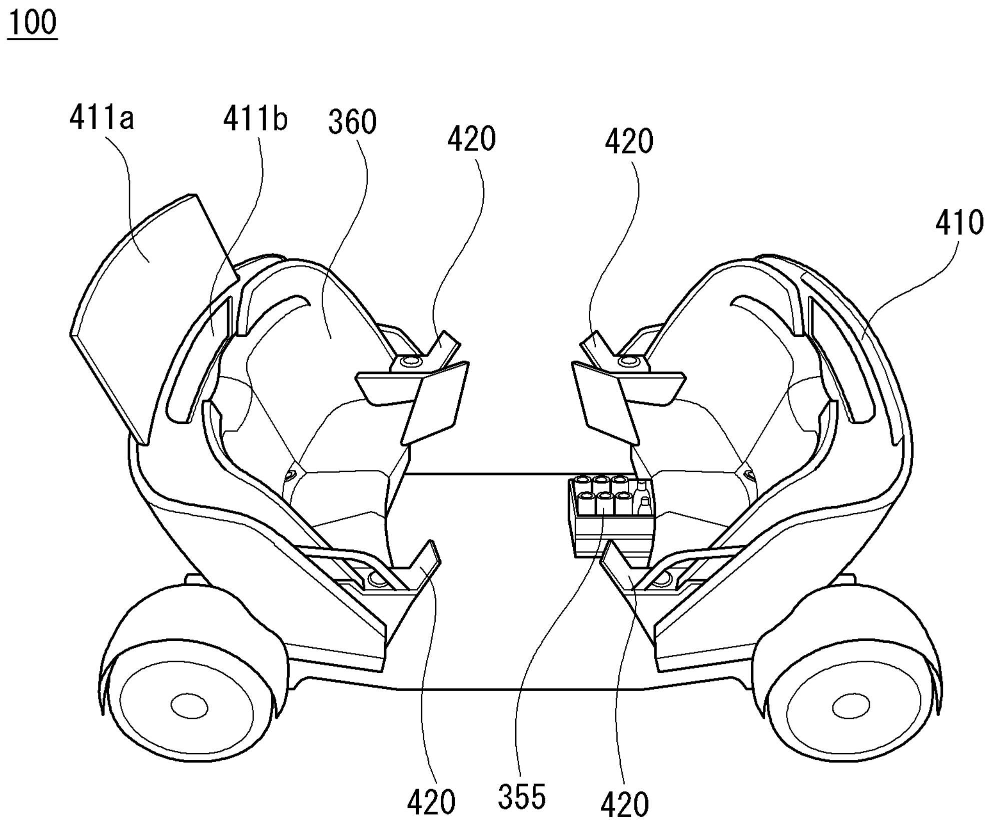
FIG. 9 is a view showing an inside of a vehicle according to an embodiment of the present disclosure.
Figure 10:
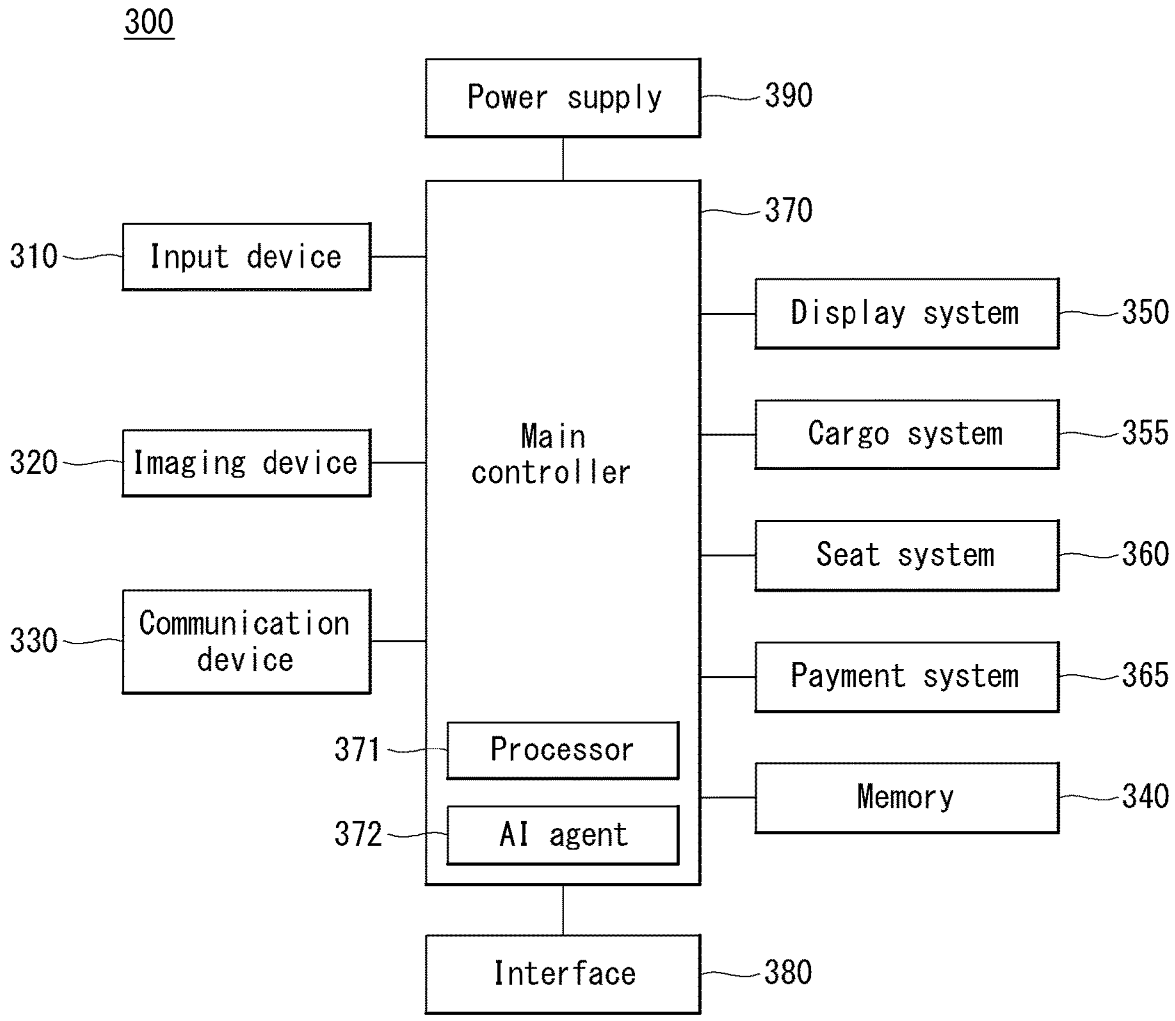
FIG. 10 is a block diagram illustrating a vehicle cabin system according to an embodiment of the present disclosure.

FIG. 9 is a diagram showing the interior of the vehicle according to an embodiment of the present disclosure. FIG. 10 is a block diagram referred to in description of a cabin system for a vehicle according to an embodiment of the present disclosure.

(1) Components of Cabin

Referring to FIGS. 9 and 10, a cabin system 300 for a vehicle (hereinafter, a cabin system) may be defined as a convenience system for a user who uses the vehicle 10. The cabin system 300 may be explained as a high-end system including a display system 350, a cargo system 355, a seat system 360 and a payment system 365. The cabin system 300 may include a main controller 370, a memory 340, an interface 380, a power supply 390, an input device 310, an imaging device 320, a communication device 330, the display system 350, the cargo system 355, the seat system 360 and the payment system 365. The cabin system 300 may further include components in addition to the components described in this specification or may not include some of the components described in this specification according to embodiments.

1) Main Controller

The main controller 370 may be electrically connected to the input device 310, the communication device 330, the display system 350, the cargo system 355, the seat system 360 and the payment system 365 and exchange signals with these components. The main controller 370 may control the input device 310, the communication device 330, the display system 350, the cargo system 355, the seat system 360 and the payment system 365. The main controller 370 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may be configured as at least one sub-controller. The main controller 370 may include a plurality of sub-controllers according to an embodiment. The plurality of sub-controllers may individually control the devices and systems included in the cabin system 300. The devices and systems included in the cabin system 300 may be grouped by function or grouped on the basis of seats on which a user may sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 may receive signals, information or data from a user terminal through the communication device 330. The user terminal may transmit signals, information or data to the cabin system 300.

The processor 371 may identify a user on the basis of image data received from at least one of an internal camera and an external camera included in the imaging device. The processor 371 may identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information and use history information of a user.

The main controller 370 may include an artificial intelligence (AI) agent 372. The AI agent 372 may perform machine learning on the basis of data obtained through the input device 310. The AI agent 371 may control at least one of the display system 350, the cargo system 355, the seat system 360 and the payment system 365 on the basis of machine learning results.

2) Essential Components

The memory 340 is electrically connected to the main controller 370. The memory 340 may store basic data about units, control data for operation control of units, and input/output data. The memory 340 may store data processed in the main controller 370. Hardware-wise, the memory 340 may be configured using at least one of a ROM, a RAM, an EPROM, a flash drive and a hard drive. The memory 340 may store various types of data for the overall operation of the cabin system 300, such as a program for processing or control of the main controller 370. The memory 340 may be integrated with the main controller 370.

The interface 380 may exchange signals with at least one electronic device included in the vehicle 10 in a wired or wireless manner. The interface 380 may be configured using at least one of a communication module, a terminal, a pin, a cable, a port, a circuit, an element and a device.

The power supply 390 may provide power to the cabin system 300. The power supply 390 may be provided with power from a power source (e.g., a battery) included in the vehicle 10 and supply the power to each unit of the cabin system 300. The power supply 390 may operate according to a control signal supplied from the main controller 370. For example, the power supply 390 may be implemented as a switched-mode power supply (SMPS).

The cabin system 300 may include at least one printed circuit board (PCB). The main controller 370, the memory 340, the interface 380 and the power supply 390 may be mounted on at least one PCB.

3) Input Device

The input device 310 may receive a user input. The input device 310 may convert the user input into an electrical signal. The electrical signal converted by the input device 310 may be converted into a control signal and provided to at least one of the display system 350, the cargo system 355, the seat system 360 and the payment system 365. The main controller 370 or at least one processor included in the cabin system 300 may generate a control signal on the basis of an electrical signal received from the input device 310.

The input device 310 may include at least one of a touch input unit, a gesture input unit, a mechanical input unit and a voice input unit. The touch input unit may convert a user's touch input into an electrical signal. The touch input unit may include at least one touch sensor for detecting a user's touch input. According to an embodiment, the touch input unit may realize a touch screen by integrating with at least one display included in the display system 350. Such a touch screen may provide both an input interface and an output interface between the cabin system 300 and a user. The gesture input unit may convert a user's gesture input into an electrical signal. The gesture input unit may include at least one of an infrared sensor and an image sensor for detecting a user's gesture input. According to an embodiment, the gesture input unit may detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit may convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it may be inserted/ejected into/from a part of a surrounding structure (e.g., at least one of a seat, an armrest and a door). When the jog dial device is parallel to the surrounding structure, the jog dial device may serve as a gesture input unit. When the jog dial device is protruded from the surrounding structure, the jog dial device may serve as a mechanical input unit. The voice input unit may convert a user's voice input into an electrical signal. The voice input unit may include at least one microphone. The voice input unit may include a beam forming MIC.

4) Imaging Device

The imaging device 320 may include at least one camera. The imaging device 320 may include at least one of an internal camera and an external camera. The internal camera may capture an image of the inside of the cabin. The external camera may capture an image of the outside of the vehicle. The internal camera may acquire an image of the inside of the cabin. The imaging device 320 may include at least one internal camera. It is desirable that the imaging device 320 include as many cameras as the number of passengers who may ride in the vehicle. The imaging device 320 may provide an image obtained by the internal camera. The main controller 370 or at least one processor included in the cabin system 300 may detect a motion of a user on the basis of an image obtained by the internal camera, generate a signal on the basis of the detected motion and provide the signal to at least one of the display system 350, the cargo system 355, the seat system 360 and the payment system 365. The external camera may acquire an image of the outside of the vehicle. The imaging device 320 may include at least one external camera. It is desirable that the imaging device 320 include as many cameras as the number of doors through which passengers ride in the vehicle. The imaging device 320 may provide an image obtained by the external camera. The main controller 370 or at least one processor included in the cabin system 300 may acquire user information on the basis of the image obtained by the external camera. The main controller 370 or at least one processor included in the cabin system 300 may authenticate a user or acquire body information (e.g., height information, weight information, etc.), fellow passenger information and baggage information of a user on the basis of the user information.

5) Communication Device

The communication device 330 may exchange signals with external devices in a wireless manner. The communication device 330 may exchange signals with external devices through a network or directly exchange signals with external devices. External devices may include at least one of a server, a mobile terminal and another vehicle. The communication device 330 may exchange signals with at least one user terminal. The communication device 330 may include an antenna and at least one of an RF circuit and an RF element which may implement at least one communication protocol in order to perform communication. According to an embodiment, the communication device 330 may use a plurality of communication protocols. The communication device 330 may switch communication protocols according to a distance to a mobile terminal.

For example, the communication device may exchange signals with external devices on the basis of C-V2X (Cellular V2X). For example, C-V2X may include sidelink communication on the basis of LTE and/or sidelink communication on the basis of NR. Details related to C-V2X will be described later.

For example, the communication device may exchange signals with external devices on the basis of DSRC (Dedicated Short Range Communications) or WAVE (Wireless Access in Vehicular Environment) standards on the basis of IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure may exchange signals with external devices using only one of C-V2X and DSRC. Alternatively, the communication device of the present disclosure may exchange signals with external devices using a hybrid of C-V2X and DSRC.

6) Display System

The display system 350 may display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be realized by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it may be inserted/ejected into/from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images may be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 and the second display device 420. The processor included in the display system 350 may generate a control signal on the basis of a signal received from at last one of the main controller 370, the input device 310, the imaging device 320 and the communication device 330.

A display area of a display included in the first display device 410 may be divided into a first area 411*a* and a second area 411*b*. The first area 411*a* may be defined as a content display area. For example, the first area 411 may display at least one of graphic objects corresponding to may display entertainment content (e.g., movies, sports, shopping, food, etc.), video conferences, food menu and augmented reality screens. The first area 411*a* may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411*b* may be defined as a user interface area. For example, the second area 411*b* may display an AI agent screen. The second area 411*b* may be located in an area defined by a seat frame according to an embodiment. In this case, a user may view content displayed in the second area 411*b* between seats. The first display device 410 may provide hologram content according to an embodiment. For example, the first display device 410 may provide hologram content for each of a plurality of users such that only a user who requests the content may view the content.

6.2) Display Device for Individual Use

The second display device 420 may include at least one display 421. The second display device 420 may provide the display 421 at a position at which only an individual passenger may view display content. For example, the display 421 may be disposed on an armrest of a seat. The second display device 420 may display graphic objects corresponding to personal information of a user. The second display device 420 may include as many displays 421 as the number of passengers who may ride in the vehicle. The second display device 420 may realize a touch screen by forming a layered structure along with a touch sensor or being integrated with the touch sensor. The second display device 420 may display graphic objects for receiving a user input for seat adjustment or indoor temperature adjustment.

7) Cargo System

The cargo system 355 may provide items to a user at the request of the user. The cargo system 355 may operate on the basis of an electrical signal generated by the input device 310 or the communication device 330. The cargo system 355 may include a cargo box. The cargo box may be hidden in a part under a seat. When an electrical signal on the basis of user input is received, the cargo box may be exposed to the cabin. The user may select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 may provide a user customized seat to a user. The seat system 360 may operate on the basis of an electrical signal generated by the input device 310 or the communication device 330. The seat system 360 may adjust at least one element of a seat on the basis of obtained user body data. The seat system 360 may include a user detection sensor (e.g., a pressure sensor) for determining whether a user sits on a seat. The seat system 360 may include a plurality of seats on which a plurality of users may sit. One of the plurality of seats may be disposed to face at least another seat. At least two users may set facing each other inside the cabin.

9) Payment System

The payment system 365 may provide a payment service to a user. The payment system 365 may operate on the basis of an electrical signal generated by the input device 310 or the communication device 330. The payment system 365 may calculate a price for at least one service used by the user and request the user to pay the calculated price.

(2) Autonomous Vehicle Usage Scenarios

Figure 11:
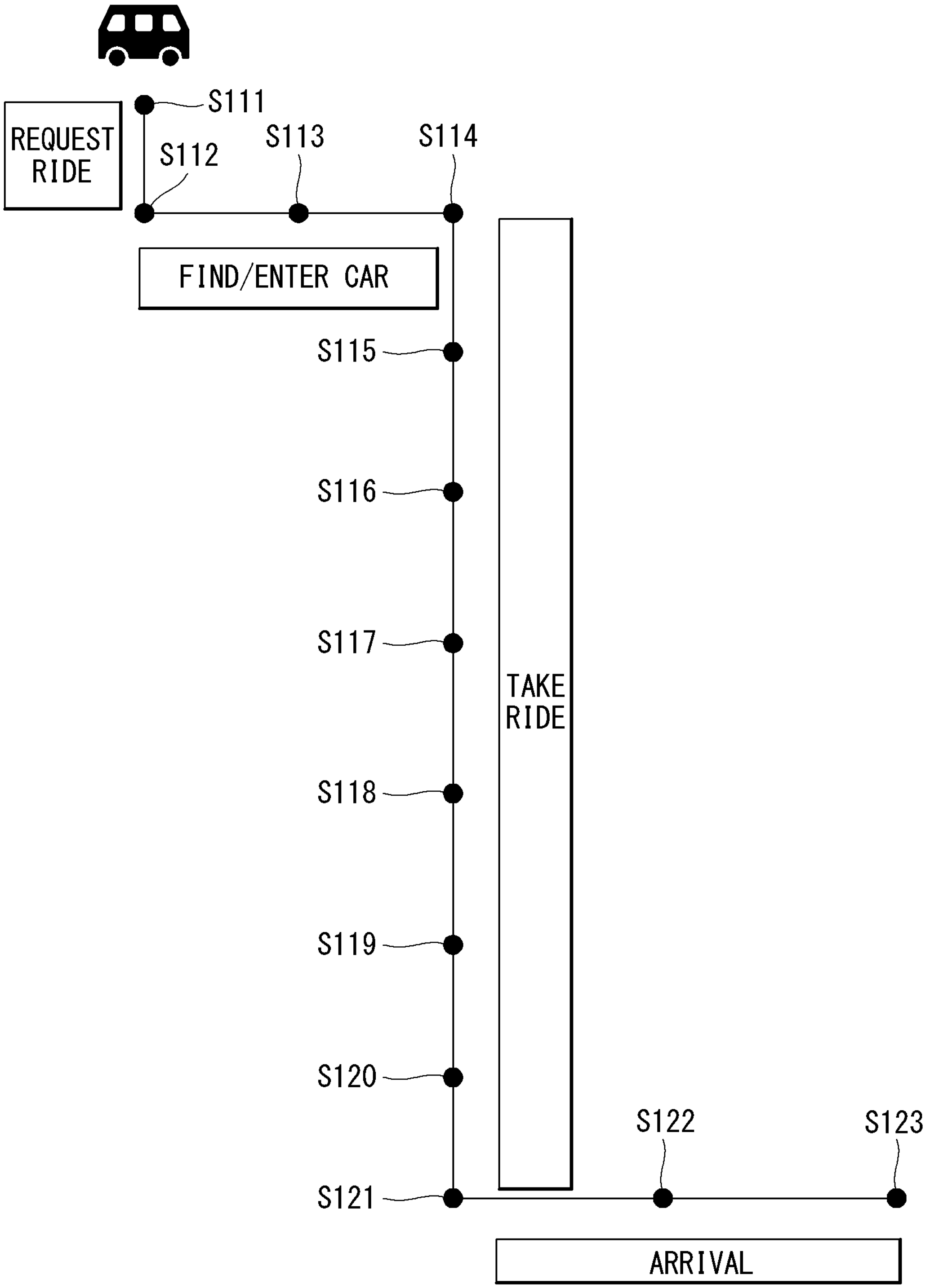
FIG. 11 is a view illustrating a usage scenario of a user according to an embodiment of the present disclosure.

FIG. 11 is a diagram referred to in description of a usage scenario of a user according to an embodiment of the present disclosure.

1) Destination Prediction Scenario

A first scenario S111 is a scenario for prediction of a destination of a user. An application which may operate in connection with the cabin system 300 may be installed in a user terminal. The user terminal may predict a destination of a user on the basis of user's contextual information through the application. The user terminal may provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device may scan a user to acquire body data and baggage data of the user. The body data and baggage data of the user may be used to set a layout. The body data of the user may be used for user authentication. The scanning device may include at least one image sensor. The image sensor may acquire a user image using light of the visible band or infrared band.

The seat system 360 may set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light may be disposed on the floor of the cabin. When a user riding in the vehicle is detected, the cabin system 300 may turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 may adjust at least one element of a seat that matches a user on the basis of obtained body information.

5) Personal Content Provision Scenario

A fifth scenario S115 is a personal content provision scenario. The display system 350 may receive user personal data through the input device 310 or the communication device 330. The display system 350 may provide content corresponding to the user personal data.

6) Item Provision Scenario

A sixth scenario S116 is an item provision scenario. The cargo system 355 may receive user data through the input device 310 or the communication device 330. The user data may include user preference data, user destination data, etc. The cargo system 355 may provide items on the basis of the user data.

7) Payment Scenario

A seventh scenario S117 is a payment scenario. The payment system 365 may receive data for price calculation from at least one of the input device 310, the communication device 330 and the cargo system 355. The payment system 365 may calculate a price for use of the vehicle by the user on the basis of the received data. The payment system 365 may request payment of the calculated price from the user (e.g., a mobile terminal of the user).

8) Display System Control Scenario of User

An eighth scenario S118 is a display system control scenario of a user. The input device 310 may receive a user input having at least one form and convert the user input into an electrical signal. The display system 350 may control displayed content on the basis of the electrical signal.

9) AI Agent Scenario

A ninth scenario S119 is a multi-channel artificial intelligence (AI) agent scenario for a plurality of users. The AI agent 372 may discriminate user inputs from a plurality of users. The AI agent 372 may control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 may provide content that may be viewed by all users together. In this case, the display system 350 may individually provide the same sound to a plurality of users through speakers provided for respective seats. The display system 350 may provide content that may be individually viewed by a plurality of users. In this case, the display system 350 may provide individual sound through a speaker provided for each seat.

11) User Safety Secure Scenario

An eleventh scenario S121 is a user safety secure scenario. When information on an object around the vehicle which threatens a user is obtained, the main controller 370 may control an alarm with respect to the object around the vehicle to be output through the display system 350.

12) Personal Belongings Loss Prevention Scenario

A twelfth scenario S122 is a user's belongings loss prevention scenario. The main controller 370 may acquire data about user's belongings through the input device 310. The main controller 370 may acquire user motion data through the input device 310. The main controller 370 may determine whether the user exits the vehicle leaving the belongings in the vehicle on the basis of the data about the belongings and the motion data. The main controller 370 may control an alarm with respect to the belongings to be output through the display system 350.

13) Alighting Report Scenario

A thirteenth scenario S123 is an alighting report scenario. The main controller 370 may receive alighting data of a user through the input device 310. After the user exits the vehicle, the main controller 370 may provide report data according to alighting to a mobile terminal of the user through the communication device 330. The report data may include data about a total charge for using the vehicle 10.

V2X (Vehicle-to-Everything)

FIG. 12 is a view illustrating V2X communication to which the present disclosure may be applied.

V2X communication refers to communication between a vehicle and all entities such as vehicle-to-Vehicle (V2V) designating communication between vehicles, vehicle-to-infrastructure (V2I) designating communication between a vehicle and an eNB or a road side unit (RSU), communication between a vehicle and an individual (pedestrian, bicyclist, driver, or passenger), vehicle-to-network (V2N), and the like.

The V2X communication may have the same meaning as or broader meaning than a V2X sidelink or the NR V2X.

V2X communication may be applicable to various services such as forward collision warning, automatic parking system, cooperative adaptive cruise control (CACC), control loss warning, traffic matrix warning, traffic vulnerable safety warning, emergency vehicle warning, speed warning on curved road, and traffic flow control and the like.

V2X communication may be provided via a PC5 interface and/or a Uu interface. In this case, in a wireless communication system supporting V2X communication, specific network entities for supporting communication between a vehicle and all entities. For example, the network entities may include a BS (eNB), a road side unit (RSU), a UE, an application server (e.g., a traffic safety server), and the like.

In addition, a UE performing V2X communication may be a vehicle UE (V-UE), a pedestrian UE, and a BS type (eNB type) RSU, a UE type RSU, a robot having a communication module, or the like, as well as a general handheld UE.

V2X communication may be performed directly between UEs or may be performed through the network entity(s). A V2X driving mode may be classified according to a method of performing V2X communication.

V2X communication V2X communication is required to support pseudonymity and privacy of a UE at the time of using the V2X application so that an operator or a third party cannot track a UE identifier within an area where the V2X is supported.

Terms frequently used in V2X communication are defined as follows.

RSU (Road Side Unit): RSU is a V2X-enabled unit capable of performing transmission and reception with a moving vehicle using a V2I service. The RSU is a fixed infrastructure entity that supports V2X applications and may exchange messages with other entities that support V2X applications. The RSU is a commonly used term in the existing ITS specification, and the reason for introducing the RSU in the 3GPP specification is to make a document easier to read in an ITS industry. The RSU is a logical entity that combines a V2X application logic with functionality of a BS (called a BS-type RSU) or a UE (called a UE-type RSU).

V2I service: A type of V2X service in which one side is a vehicle and the other side belongs to an infrastructure.

V2P service: A type of V2X service in which one side is a vehicle and the other side is a device carried by an individual (e.g., a handheld UE device carried by a pedestrian, a cyclist, a driver, or a passenger).

V2X service: A type of 3GPP communication service in which a transmitting or receiving device is involved in a vehicle.

V2X enabled UE: A UE supporting the V2X service.

V2V service: A type of V2X service in which both are vehicles.

V2V communication range: A range of direct communication between two vehicles participating in the V2V service.

The V2X application, called vehicle-to-everything (V2X), includes four types of (1) vehicle-to-vehicle (V2V), (2) vehicle-to-infrastructure (V2I), (3) vehicle-to-network (V2N), and (4) vehicle-to-pedestrian (V2P).

FIGS. 13A and 13B illustrate a resource allocation method in a sidelink in which V2X is used.

In a sidelink, different physical sidelink control channels (PSCCHs) may be allocated to be spaced apart from each other in a frequency domain and different physical sidelink shared channels (PSSCHs) may be allocated to be spaced apart from each other. Alternatively, different PSCCHs may be allocated in succession in the frequency domain and PSSCHs may also be allocated in succession in the frequency domain.

NR V2X

Support for V2V and V2X services in LTE was introduced to extend the 3GPP platform to the automotive industry during 3GPP releases 14 and 15.

Requirements for supporting enhanced V2X use cases are largely classified into four use case groups.

(1) Vehicle platooning enables a platoon in which vehicles move together to be dynamically formed. All the vehicles of the platoon obtain information from a lead vehicle to manage the platoon. The information allows the vehicles to drive more harmoniously in a normal direction and go in the same direction and drive together.

(2) Extended sensors allow row data or processed data collected via local sensors or live video images to be exchanged in vehicles, road site units, pedestrian devices, and V2X application servers. Vehicles may raise environmental awareness beyond what their sensors may detect, and more extensively and generally recognize a local situation. A high data rate is one of main features.

(3) Advanced driving enables semi-automatic or fully-automatic driving. It allows each vehicle and/or RSU shares self-awareness data obtained from local sensors with nearby vehicles and allow each vehicle to synchronize and coordinate trajectory or manoeuvre. Each vehicle shares a driving intent with a vehicle which drives nearby.

(4) Remote driving allows a remote driver or V2X application to drive a remote vehicle for passengers who are unable to drive on their own or in a remote vehicle in a hazardous environment. If fluctuations are limited and a route may be predicted such as public transportation, driving based on cloud computing may be used. High reliability and low standby time are key requirements.

Identifier for V2X Communication Via PC5

Each terminal (or user equipment (UE)) has a Layer-2 identifier for V2 communication through one or more PC5. This includes a source Layer-2 ID and a destination Layer-2 ID.

The source and destination Layer-2 IDs are included in a Layer-2 frame, and the Layer-2 frame is transmitted through a layer-2 link of PC5 identifying a source and a destination of Layer-2 on a frame.

The source and destination Layer-2 ID selection of a UE is based on a communication mode of the V2X communication of the PC5 of the layer-2 link. The source Layer-2 ID may differ between different communication modes.

If IP-based V2X communication is allowed, the UE is configured to use a link local IPv6 address as a source IP address. The UE may use the IP address for V2X communication of PC5, even without sending a Neighbor Solicitation and Neighbor Advertisement message for searching for duplicate addresses.

If one UE has an active V2X application that requires personal information protection supported in a current geographic area, the source Layer-2 ID may change over time and be randomized in order for the source UE (e.g., vehicle) to be tracked or identified from another UE only for a certain time. In the case of IP-based V2X communications, the source IP address must also change over time and be randomized.

Changes in identifiers of the source UE should be synchronized in a layer used for PC5. In other words, if an application layer identifier is changed, the source Layer-2 ID and the source IP address are also required to be changed.

1. Identifier for Broadcast Mode V2X Communication

For a broadcast mode of V2X communication through PC5, the UE is set to a destination Layer-2 ID for using a V2X service. The destination Layer-2 ID to be used for the V2X service is selected according to a configuration as described in 5.1.2.1 of the 3GPP 23.287 document.

The UE self-selects the source Layer-2 ID. The UE may use different source Layer-2 IDs according to different types of PC5 reference points (i.e., LTE-based PC5, NR-based PC5).

2. Identifier for Groupcast Mode V2X Communication

For a groupcast mode of V2X communication via PC5, a V2X application layer may provide group identifier information. When the group identifier information is provided by the V2X application layer, the UE converts the provided group identifier into a destination Layer-2 ID. If the group identifier information is not provided by the V2X application layer, the UE determines the destination Layer-2 ID according to a mapping configuration between service types as described in 5.1.2.1 of the 3GPP 23.287 document. The UE self-selects the source Layer-2 ID.

3. Identifier for Unicast Mode V2X Communication

For a unicast mode of V2X communication over PC5, the destination Layer-2 ID is used on the basis of a communication peer discovered during establishment of a unicast link. Initial signaling for establishing a unicast link may use a default destination Layer-2 ID associated with a service type (i.e., PSID/ITS-AID) configured for establishing the unicast link. During the unicast link establishment procedure, Layer-2 IDs are exchanged and used in subsequent communication between the two UEs.

An Application Layer ID is associated with one or more V2X applications of the UE. If the UE has one or more Application Layer IDs, each Application Layer ID of the same UE may be viewed as an Application Layer ID of a different UE from the perspective of a peer UE.

Since the V2X application layer does not use Layer-2 IDs, the UE must maintain mapping between Application Layer IDs and source Layer-2 IDs used in the unicast link. This allows V2X applications to change the source Layer-2 ID without interruption.

When the Application Layer ID is changed, if a link is used for V2X communication with the changed Application Layer ID, the source Layer-2 ID of the unicast link is changed.

The UE may establish a plurality of unicast links with the peer UE, and may use the same or different source Layer-2 ID for the unicast link.

Broadcast Mode

Figure 14:
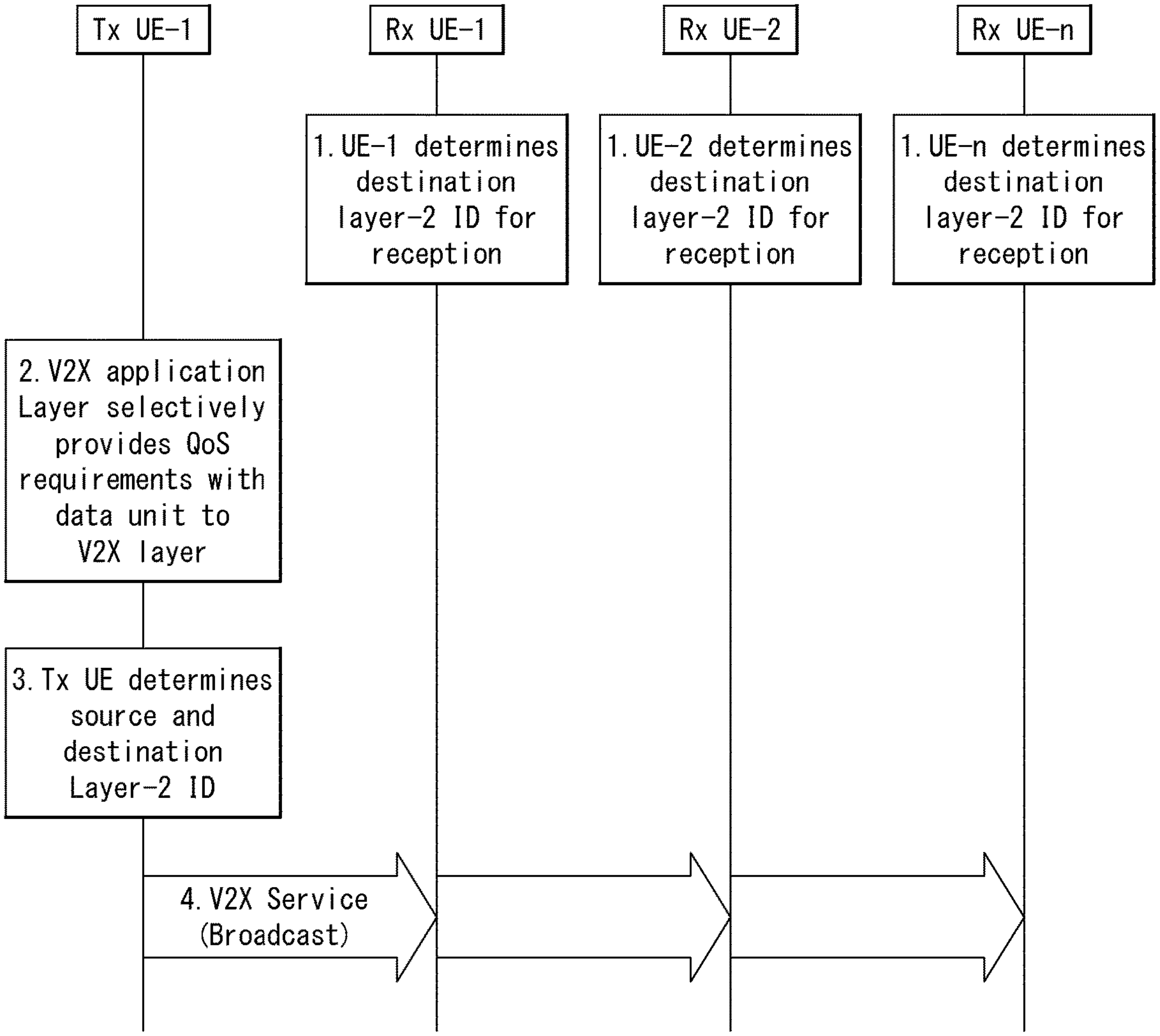
FIG. 14 is a view illustrating a procedure for a broadcast mode of V2X communication using PC5.

FIG. 14 is a view illustrating a procedure for a broadcast mode of V2X communication using PC5.

1. A receiving UE determines a destination Layer-2 ID for broadcast reception. The destination Layer-2 ID is transmitted to an AS layer of the receiving UE for reception.

2. A V2X application layer of a transmitting UE may provide a data unit and provide V2X application requirements.

3. The transmitting UE determines the destination Layer-2 ID for broadcast. The transmitting UE self-assigns a source Layer-2 ID.

4. One broadcast message transmitted by the transmitting UE transmits V2X service data using the source Layer-2 ID and the destination Layer-2 ID.

Groupcast Mode

Figure 15:
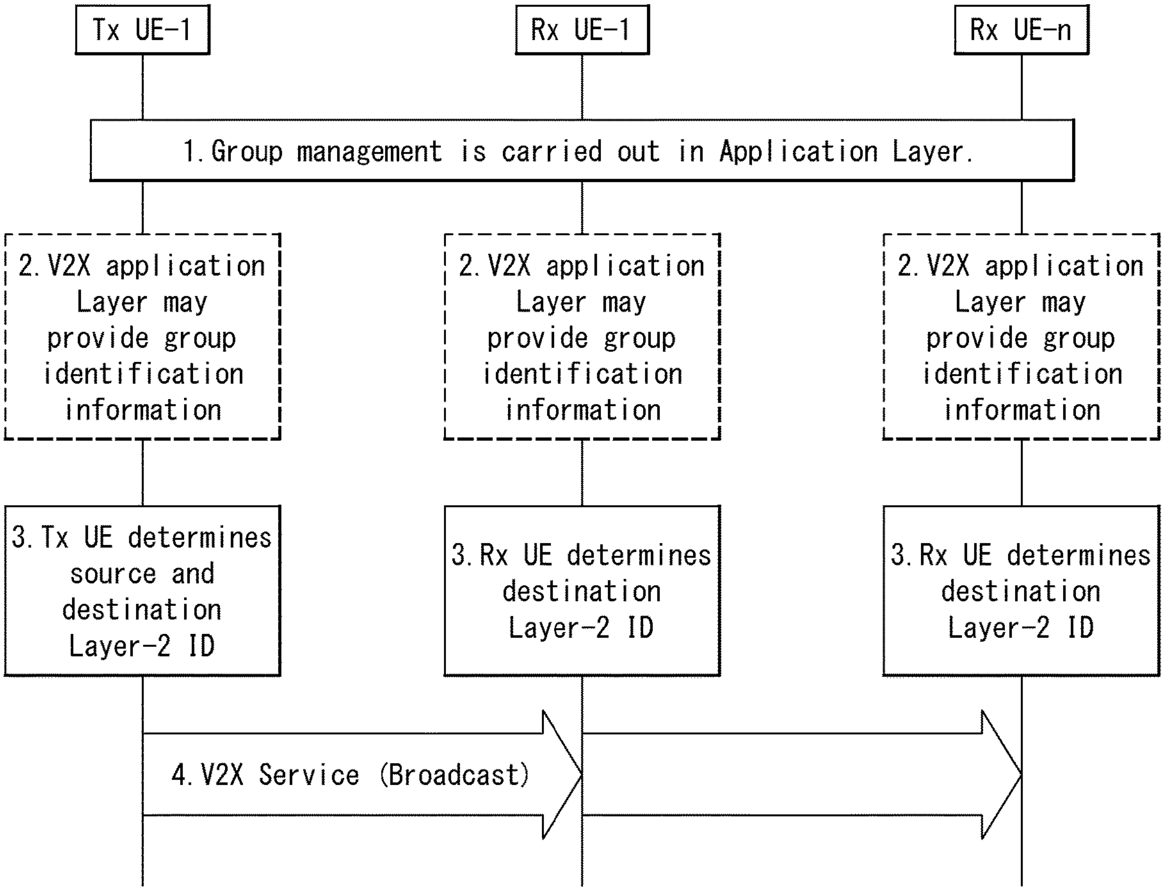
FIG. 15 is a view illustrating a procedure for a groupcast mode of V2X communication using PC5.

FIG. 15 is a view illustrating a procedure for a groupcast mode of V2X communication using PC5.

1. V2X group management is performed through a V2X application layer.

2. The V2X application layer may provide a group identifier as described in 5.6.1.3 of the 3GPP 23.287 document. In addition, the V2X application layer may provide service requirements for communication.

3. The transmitting UE determines the source Layer-2 ID and the destination Layer-2 ID, and the receiving UE determines the destination Layer-2 ID. The destination Layer-2 ID is delivered to an AS layer of the receiving UE for group communication transmission. The transmitting UE determines a PC5 QoS parameter for groupcast.

4. The transmitting UE has a V2X service related to group communication. In addition, the transmitting UE transmits V2X service data using the source Layer-2 ID and the destination Layer-2 ID.

The transmitting UE at step 4 has only one groupcast message.

Unicast Mode

Figure 16:
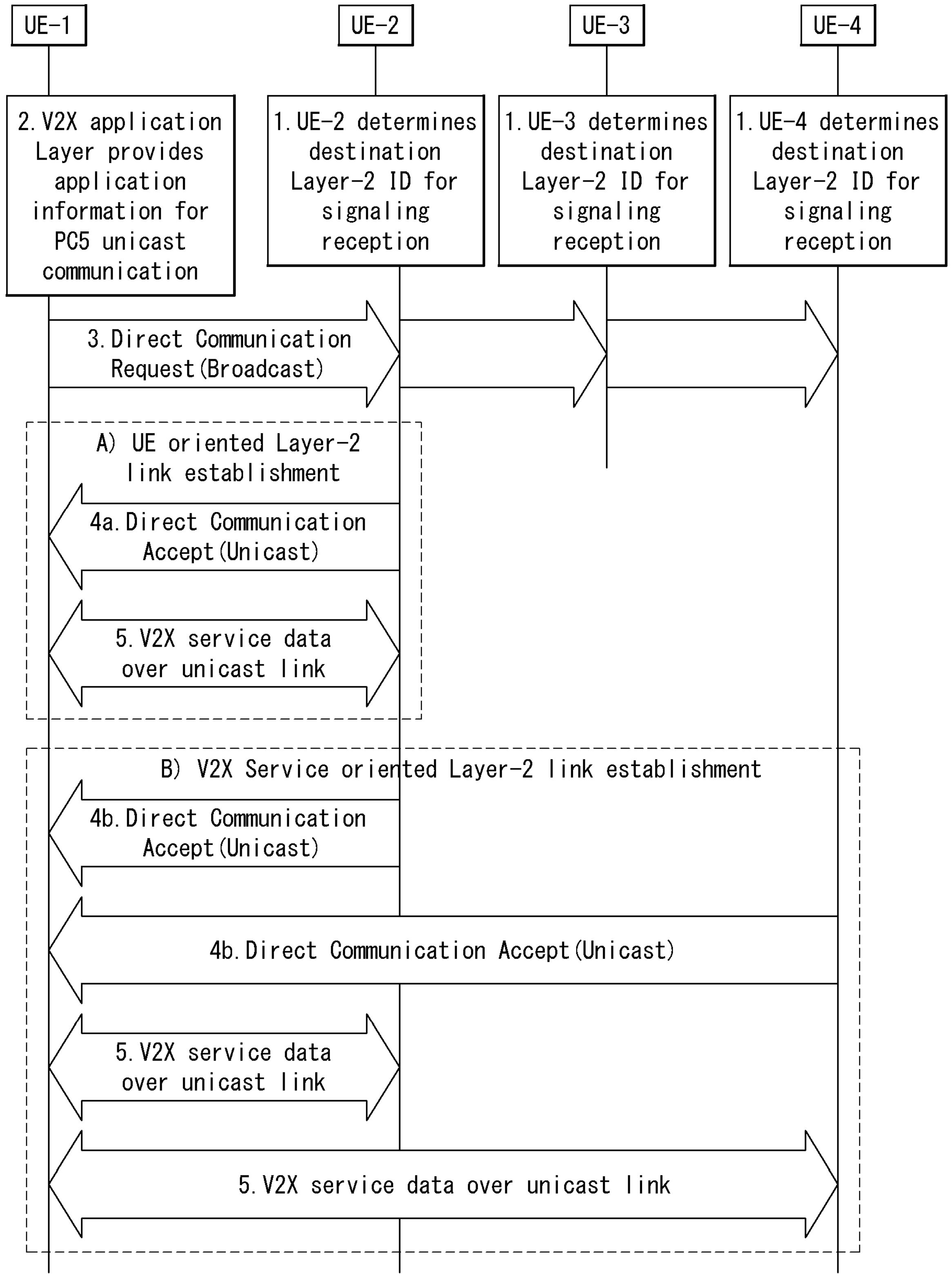
FIG. 16 is a view illustrating a procedure for unicast mode of V2X communication using PC5.

FIG. 16 is a view illustrating a procedure for unicast mode of V2X communication using PC5.

1. The UE determines a destination Layer-2 ID for receiving signaling for establishing a PC5 unicast link.

2. A V2X application layer of the UE-1 provides application information for PC5 unicast communication. The application information includes the service type (e.g., PSID or ITS-AID) of the V2X application and an initiating UE's Application Layer ID.

The application layer ID of the target UE may be included in the application information. The V2X application layer of the UE-1 may provide service requirements for the corresponding unicast communication. The UE-1 determines a PC5 QoS parameter and PFI.

If the UE-1 determines to reuse the existing PC5 unicast link, the UE triggers a Layer-2 link modification procedure.

3. The UE-1 transmits a Direct Communication Request message to initiate a unicast layer-2 link establishment procedure. The Direct Communication Request message includes the following:

Source User Info: Application Layer ID of the initiating UE (i.e., Application Layer ID of the UE-1)

If the V2X application layer provides a target UE Application Layer ID of step 2, the following information is included.

Target User Info: Application Layer ID of the target UE (i.e., Application Layer ID of UE-2)

V2X Service Info: Information on a V2X Service requesting establishment of a Layer-2 link (e.g., PSID or ITS-AID).

Indication of whether to use IP communication

IP Address Configuration: IP address configuration required for such a link in IP communication (Details of the IP address configuration are FFS)

QoS Info: Information about PC5 QoS Flow. PFI and corresponding PC5 QoS parameter for each PC5 QoS Flow (i.e. conditionally other parameters such as PQI and MFBR/GFBR, etc.) (Whether QoS information exchange is required is FFS)

The UE-1 transmits a direct communication request message through PC5 broadcast by using a source layer-2 ID and a destination layer-2 ID.

4. Direct Communication Accept message is transmitted to UE-1 as follows.

4a. (Establishing Layer-2 link directed to the UE) If the Target User Info is included in the Direct Communication Request message, it is transmitted to the target UE (i.e., the UE-2 responds with a Direct Communication Accept message).

4b. (Establishing Layer-2 link directed to V2X service) If Target User Info is not included in the Direct Communication Request message, it is transmitted to a UE interested in using a known V2X service. To determine to establish a Layer-2 link, it responds to a request from the UE-1 by sending a Direct Communication Accept message (UE-2 and UE-4).

The Direct Communication Accept message includes the following:

Source User Info: Application Layer ID of UE for transmitting Direct Communication Accept message QoS Info: information on PC5 QoS Flow. PFI and corresponding PC5 QoS parameters for each PC5 QoS Flow (i.e. conditionally different parameters such as PQI and MFBR/GFBR, etc.)

The destination Layer-2 ID is set to the source Layer-2 ID of the received Direct Communication Request message.

When the Direct Communication Accept message is received from the peer UE, the UE-1 obtains a Layer-2 ID of the peer UE used for future communication for signaling and data traffic for the unicast link.

The V2X layer of the UE that establishes the PC5 unicast link delivers the unicast link and the PC5 Link Identifier assigned to the information related to the unicast link to the AS layer. The information related to the PC5 unicast link includes Layer-2 ID information (i.e., Source Layer-2 ID and Destination Layer-2 ID). Through this, the AS layer may maintain the PC5 Link Identifier with information associated with the PC5 unicast link.

5. V2X service data is transmitted via unicast link established as follows:

The PC5 Link Identifier and the PFI are provided to the AS layer along with the V2X service data.

The UE-1 transmits V2X service data using the source Layer-2 ID and the destination Layer-2 ID (i.e., the Layer-2 ID of the peer UE for the unicast link).

Since the PC5 unicast link is bidirectional, the peer UE of the UE-1 may transmit V2X service data to the UE-1 through the unicast link.

MEC Server

Figure 17:
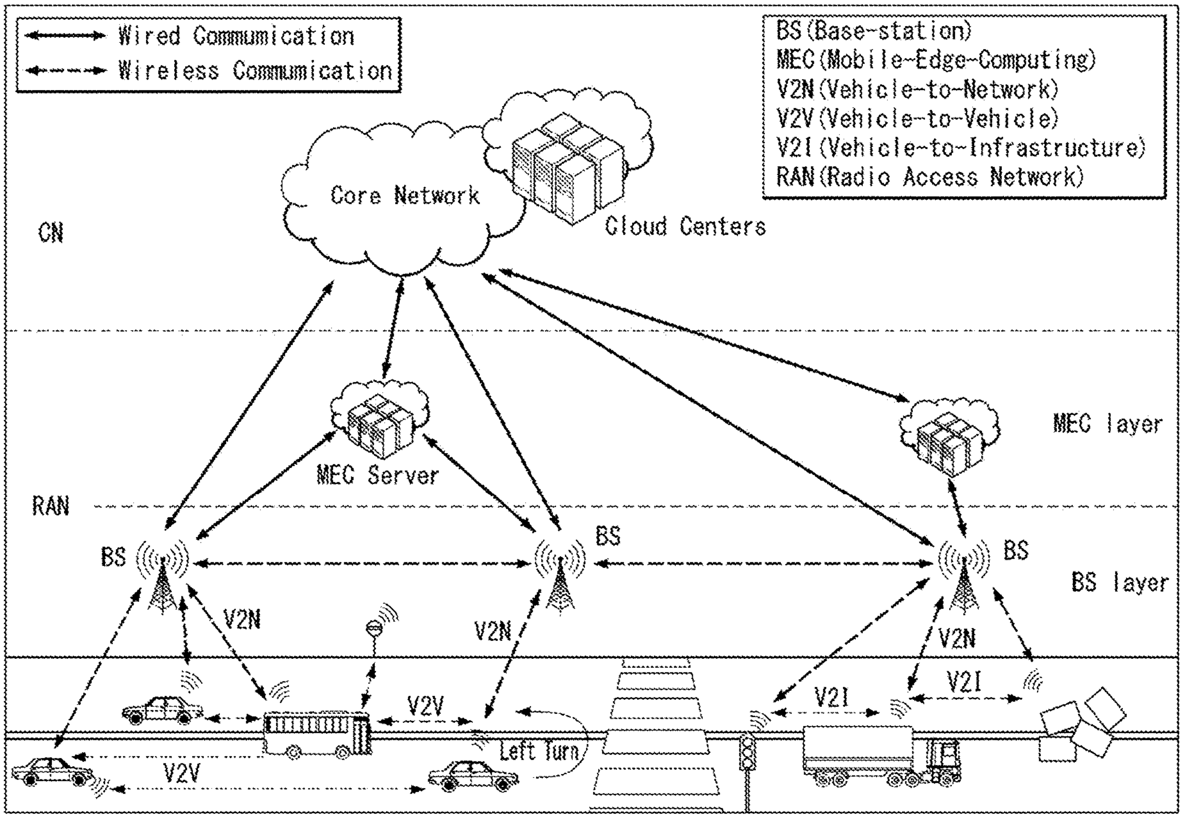
FIG. 17 illustrates an architecture of a mobile edge computing (MEC) server that may be applied in the present disclosure.

FIG. 17 illustrates architecture of a mobile edge computing (MEC) server applicable to the present disclosure.

The MEC server not only can perform a role of a normal server but also can provide flexible vehicle related services and allow efficient network operation by being connected to a base station (BS) near a road in a radio access network (RAN). Particularly, a network-slicing and traffic scheduling policy supported by the MEC server can aid in network optimization.

In the architecture, MEC servers may be integrated in the RAN and located at an SI-user plane interface (for example, between a core network and a BS) in a 3GPP system. Each MEC server can be regarded as an independent network element and does not affect connection of existing wireless networks. An independent MEC server is connected to a BS through a dedicated communication network and can provide specific services to various end-users located in the corresponding cell. Such an MEC server and a cloud server are connected through Internet-backbone and can share information. Although the Internet-backbone is connected in a wired manner in the architecture, the Internet-backbone may be connected in a wireless manner according to a configuration method.

The MEC server is independently operated and can control a plurality of BSs. Particularly, the MEC server performs services for autonomous vehicles, an application operation such as a virtual machine (VM), and an operation at a mobile network edge based on a virtualization platform.

A base station (BS) is connected to MEC servers and a core network to facilitate flexible user traffic scheduling required to execute provided services.

The MEC server and a 3G radio network controller (RNC) are located at similar network levels but the following differences are present therebetween.

- Dozens, hundreds or more of BSs can be controlled by the RNC, and transmission delay occurrence increases as the number of configured BSs increases. However, the MEC server directly interacts with less than 10 BSs in general and thus can prevent excessive transmission delay.
- In addition, since the MEC server in the architecture provides efficient communication between a BS and the core network and also permits previous communication between BSs and between a BS and the core network, the MEC server can be used in the corresponding network.
- When large-capacity user traffic is generated in a specific cell, the MEC server can perform task offloading and cooperation processing on the basis of an interface between neighboring BSs.
- The RNC provides only a fixed function for wireless network control, whereas the MEC server has an open operation environment based on software and thus new services of application providers can be easily provided.

The architecture including the MEC server can provide the following advantages.

- Service waiting time reduction: A data reciprocating time is reduced and a service provision speed is high because services are performed near end-users.
- Flexible service provision: MEC applications and virtual network functions (VNF) provide flexibility and geographical distribution in service environments. Various applications and network functions can be programmed and only a specific user group can be selected or compiling only for the specific user group can be performed using such a virtualization technique. Accordingly, provided services can be applied more closely to user requirements.
- Cooperation between BSs: The MEC server has central control capability and can minimize interaction between BSs. This can simplify a process for executing basic functions of a network such as handover between cells. Such a function can be useful in automated vehicle & highway systems having many users.
- Minimization of congestion: Terminals on roads periodically generate a large amount of small packets in automated vehicle & highway systems. The MEC server in RNC can reduce the amount of traffic that needs to be transmitted to a core network by performing a specific service and thus decrease processing loads of a cloud in a centralized cloud system and minimize network congestion.
- Reduction of operation expenses: The MEC server integrates a network control function and individual services and thus can increase profitability of mobile network operators (MNOs) and facilitates rapid and efficient maintenance and upgrade through installation density adjustment.

The 5G communication technology described above may be applied in combination with methods to be proposed in the present disclosure, which will be described later, or supplemented to specify or clarify the technical features of the methods to be proposed in the present disclosure.

Hereinafter, various embodiments of the present disclosure will be described in detail with reference to the accompanying drawings.

CAN Message Format

Figure 18:
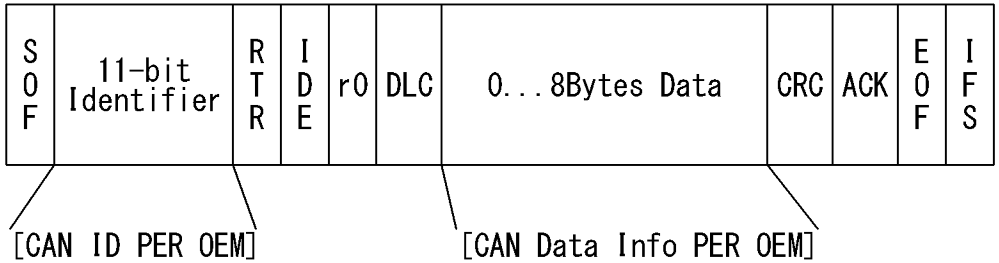
FIG. 18 is an example of a CAN message format to which the present disclosure may be applied.

FIG. 18 is an example of a CAN message format to which the present disclosure may be applied.

A controller area network (CAN) is a standard communication specification designed to allow microcontrollers or devices to communicate with each other in a vehicle without a host computer. Electronic control units (ECUs) in the vehicle communicate using a CAN protocol.

The CAN provides a stable network (multi-master scheme) that allows multiple CAN devices to communicate with each other. An advantage of such a network is that an ECU does not have analog and digital inputs for each device in a system, but only a single CAN interface, thus reducing overall cost and weight of the vehicle.

The CAN is a multi master network and uses a carrier sense multiple access/collision detection with arbitration on message priority (CSMA/CD+AMP) scheme. First, whether a CAN bus line is being used is determined before sending a message to a CAN node. In addition, collision detection between messages is performed. In this connection, a message sent from one node does not include address of a sender or receiver. That is, communication is not performed in an addressing manner. Instead, each node has a unique identifier (ID-11 bits or 29 bits) at a beginning of the message to identify each node on the CAN network.

All nodes connected on the network receive a message on the network and then accept the message only when the message is a message of an identifier that they need. Otherwise, the message is ignored. When data of several nodes flowing on the network (CAN communication line) flows into a node that is required for a user at the same time, a priority of a message to be accepted first is determined by comparing identifier numbers of messages. The lower the identifier number, the higher the priority is set. High-priority messages are guaranteed access to the CAN bus. In this connection, low-priority messages are automatically retransmitted to a next bus cycle. Each CAN message has an 11-bit identifier (CAN 2.0A) or a 29-bit identifier (CAN 2.0B) and the identifier is located at the beginning of the CAN message. Such an identifier identifies a form of the message and assigns the priority to the message.

Referring to FIG. 18, in a frame structure of the CAN, a start of frame (SOF) corresponds to a bit indicating a start of data. The identifier (ID) identifies content of the data and indicates priorities of ECUs. DLC may represent a length of the data, Data may be data to be transmitted, and CRC may be used for error detection. Acknowledgment (ACK) indicates whether the data was transmitted without error. End of Frame (EOF) indicates an end of a frame. The CAN messages may be stored in different formats for different vehicle manufacturers.

When not all vehicles are changed to fully autonomous vehicles, autonomous and non-autonomous vehicles may be mixed on a road. Data generated by such a non-autonomous vehicle and data generated by the autonomous vehicle may have different formats. When the data formats are different from each other, the non-autonomous vehicles cannot interpret the data of the autonomous vehicles and the autonomous vehicles cannot interpret data of the non-autonomous vehicles.

When a V2X message from the autonomous vehicle is delivered to a MEC server through the network, corresponding data may be changed to be adapted for a format defined for each manufacturer of the non-autonomous vehicle in the MEC server and a changed data message may be delivered to the non-autonomous vehicle.

The CAN messages and the like defined for each manufacturer of the non-autonomous vehicle may be transmitted to the MEC server via the network, corresponding information may be changed into a format suitable for a V2X message in the MEC server, and then the V2X message may be transmitted to the autonomous vehicle.

Thus, data sharing may be achieved between the autonomous vehicle and the non-autonomous vehicle, and data sharing may be achieved through the MEC server without any special device in the non-autonomous vehicle.

In addition, thus, stability between the autonomous vehicle and the non-autonomous vehicle may be secured.

In the present disclosure, the non-autonomous vehicle may store data such as the CAN messages in different formats for different manufacturers and transmit the CAN messages in the different formats to the MEC server via the network. The MEC server may receive and interpret the corresponding data and change the corresponding data into a V2X message format for the autonomous vehicle. Further, the MEC server may deliver the data in the V2X message format to an autonomous vehicle located in a communication region thereof.

In the present disclosure, the autonomous vehicle may send a V2X message containing status information of the autonomous vehicle to the MEC server via the network. The MEC server may change the received V2X message into a format defined by the manufacturer based on manufacturer information of non-autonomous vehicles located in the communication region of the MEC server and then deliver the V2X message in the format defined by the manufacturer to the non-autonomous vehicles.

FIG. 19 is an example of a PVD to which the present disclosure may be applied.

A probe vehicle data (PVD) message is a message for a vehicle terminal to deliver vehicle driving state to a roadside device in a SAE J2735 standard. Table 1 and Table 2 exemplify an information item configuration of such a PVD message.

TABLE 1

| Probe Vehicle Data | | | EXPLANATION | REMARKS |
|---|---|---|---|---|
| | msgID | | MESSAGE ID | SAEJ2735 PVD ID |
| | probeID | name | TERMINAL VERSION | CITSOBE-0001 |
| | | id | TERMINAL TEMPORARY ID | Random |
| | | vehicleClass | VEHICLE PURPOSE | USAGE OF VEHICLE INPUT INTO OBU |
| | startVector | year | STARTING YEAR | SYSTEM TIME SYNCHRONIZED WITH GPS |
| | | month | STARTING MONTH | SYSTEM TIME SYNCHRONIZED WITH GPS |
| | | latitude | STARTING LATITUDE | USE GPS LATITUDE INFORMATION |
| | | longitude | STARTING LONGITUDE | USE GPS LONGITUDE INFORMATION |
| | | elevation | STARTING ALTITUDE | USE GPS ALTITUDE INFORMATION |
| | vehicleType | | VEHICLE TYPE | TYPE OF VEHICLE INPUT IN OBU |
| snaps | thePosition | day | STARTING DATE | SYSTEM TIME SYNCHRONIZED WITH GPS |
| hots | | hour | STARTING TIME | SYSTEM TIME SYNCHRONIZED WITH GPS |
| | | minute | COLLECTION MINUTES | SYSTEM TIME SYNCHRONIZED WITH GPS |
| | | second | COLLECTION SECONDS | SYSTEM TIME SYNCHRONIZED WITH GPS |
| | | longitude | LONGITUDE | USE GPS LONGITUDE INFORMATION |
| | | latitude | LATITUDE | USE GPS LATITUDE INFORMATION |
| | | elevation | ALTITUDE | USE GPS ALTITUDE INFORMATION |
| | | heading | DIRECTION | USE GPS DIRECTION INFORMATION |
| | | speed | SPEED | VEHICLE INFORMATION1 (SPEED) WHEN GPS PRIORITY IS NOT RECEIVED |
| | | posAccuracy | POSITION ACCURACY | GPS ACCURACY |

TABLE 1-continued

| Probe Vehicle Data | | | EXPLANATION | REMARKS |
|---|---|---|---|---|
| Safety Extension | events | HazardLights | EMERGENCY LIGHT | VEHICLE INFORMATION 11 (EMERGENCY LIGHT) |
| | | StopLineViolation | STOP LINE VIOLATION | COMPARE INTERSECTION GID STOPLINE LOCATION AND GPS LOCATION DIRECTION |
| | | ABSactivated | ABS OPERATION | WHEN BRAKE PRESSURE CHANGES FROM 0 TO 4 OR HIGHER |
| | | Traction ControlLoss | TRACTION CONTROL UNAVAILABLE | NOT SUPPORTED |
| | | Stability Controlactivated | CAR BODY REVISING OPERATION | NOT SUPPORTED |
| | | Hazardous Materials | HAZARDOUS MATERIALS | NOT SUPPORTED |
| | | Emergency Response | EMERGENCY VEHICLE | USAGE OF VEHICLE INPUT INTO OBU, OPERATION TERMINAL EMERGENCY BUTTON INPUT |
| | | HardBraking | SUDDEN STOP (BRAKING SHARPLY) | WHEN SPEED PER SECOND IS REDUCED BY EQUAL TO OR MORE THAN 14 KM/H WHILE USING BRAKE |
| | | LightsChanged | BLINKER CHANGING | VEHICLE INFORMATION 11 (LEFT AND RIGHT EMERGENCY LIGHTS) |
| | | WipersChanged | WIPER CHANGING | NOT SUPPORTED |
| | | FlatTire | TIRE PRESSURE SHORTAGE | VEHICLE INFORMATION 13 (TIMER INPUT) |
| | | DisabledVehicle | ENGINE STOP | WHEN THROTTLE >0, RPM = 0 |
| | | AirBagDeployment | AIRBAG DEPLOYMENT | NOT SUPPORTED |
| | extevents | GetOnDown | GET ON AND OFF | WHEN SPEED IS <4 KM/H, DOOR IS OPENED |
| | | Trouble | BREAKDOWN (TROUBLE) | RPM >0, THROTTLE >0, GEAR RATIO >1, SPEED <4 KM/H WITHOUT USING BRAKE |
| | | HardDeceleration | ABRUPT DECELERATION | WHEN SPEED PER SECOND DECELERATES EQUAL TO OR MORE THAN 14 KM/H WITHOUT USING BRAKE |
| | | HardStop | ABRUPT STOP | WHEN VEHICLE IS STOPPED AFTER SPEED PER SECOND THEREOF IS DECELERATED EQUAL TO OR MORE THAN 14 KM/H USING BRAKE |
| | | HardTurn | ABRUPT TURN | WHEN DIRECTION ANGLE CHANGES EQUAL TO OR MORE THAN 45°FOR A CERTAIN TIME AT SPEED OF EQUAL TO OR HIGHER THAN 15 KM/H PER SECOND |
| | | UTurn | U-TURN | WHEN DIRECTION ANGLE CHANGES EQUAL TO OR MORE THAN 60°FOR A CERTAIN TIME AT SPEED OF EQUAL TO OR HIGHER THAN 15 KM/H PER SECOND |
| | | RoadWork | ROAD WORK | USAGE OF VEHICLE INPUT INTO OBU, OPERATION TERMINAL EMERGENCY BUTTON INPUT |
| | Status | lights | EMERGENCY LIGHT ON AND OFF | VEHICLE INFORMATION 11 (EMERGENCY LIGHTS) |
| | | lightBar | LIGHT BAR ON AND OFF | OPERATION TERMINAL EMERGENCY BUTTON INPUT |
| | | brakeStatus | BRAKE STATUS | VEHICLE INFORMATION 6 (BRAKE STATUS) |

TABLE 2

| Probe Vehicle Data | | EXPLANATION | REMARKS |
|---|---|---|---|
| throttlePos | | THROTTLE OPENING RATE | VEHICLE INFORMATION 4 (THROTTLE) |
| gpsStatus | | GPS STATUS | GPS RECEPTION STATUS |
| transitStatus | | TRANSMIT STATUS | DOOR OPEN |
| acceleration | | ACCELERATION PER SECOND | ACCELERATION PER SECOND IN KM/H |
| worklanes | | LANE | USING ROAD WORK LANE |
| curiane | | CURRENT LANE | CURRENT LANE (IN MAP DATA REGION) |
| vehicleCnt | | VEHICLE NUMBER | NUMBER OF VEHICLES RECEIVED IN BSMS PER SECOND |
| servicelog | id | SERVICE NUMBER | TEMPORARY ADDITION FOR SERVICE EFFECT ANALYSIS |
| | msgid | MESSAGE ID | TEMPORARY ADDITION FOR SERVICE EFFECT ANALYSIS |
| | posid | POSITION ID | TEMPORARY ADDITION FOR SERVICE EFFECT ANALYSIS |
| | event | EVENT | TEMPORARY ADDITION FOR SERVICE EFFECT ANALYSIS |
| | time | SERVICE TIME | TEMPORARY ADDITION FOR SERVICE EFFECT ANALYSIS |

When a relevant group standard is established, the information item configuration may apply mutatis mutandis to the information format configuration proposed by the corresponding relevant standard.

Conversion Delay Time Correction

The present disclosure may calculate a delay time spent in converting a Message Type. For example, in the MEC server, Convert V2X message to CAN message, Convert CAN message to V2X message, and Convert CAN message to CAN message may have different conversion delay times. That is, the V2X message includes all the information in one message, but since the CAN message may be sent to multiple standard CAN messages, more delay time may occur in processing the CAN message than the V2X message.

An embodiment for calculating such a conversion delay time is as follows.

1. Convert V2X Message to CAN Message

An ID (e.g., Timestamp) may be added to an identifier field of the CAN message format generated by the MEC server. A timestamp value included in the received V2X Message may be added to the Timestamp (e.g., FFAB) of the CAN message to send the CAN message. Thus, a non-autonomous vehicle that has received the CAN message may identify a generation time of a first V2X message from the autonomous vehicle.

2. Convert CAN Message to V2X Message

The timestamp value of the V2X message generated by the MEC server may be added as a generation time of the V2X message minus the message type conversion delay time. Thus, the autonomous vehicle that has received the V2X message may identify a time when the MEC server received the first CAN message from the non-autonomous vehicle.

3. Convert CAN Message to CAN Message

The ID (Timestamp) may be added to the identifier field of the CAN message format generated by the MEC server. Then, a generation time of the CAN message by the MEC server minus the message type conversion delay time may be added to the Timestamp (e.g., FFAB) to send the CAN message. Thus, the non-autonomous vehicle that has received the CAN message may identify the time when the MEC server received the first CAN message.

Through the above embodiments, in order to correct the conversion delay time, the autonomous vehicle or the non-autonomous vehicle that received the V2X message or the CAN message from the MEC server may compare a time point when the V2X message or the CAN message is received with the timestamp included in the V2X message and the Timestamp included in the CAN message to correct a position of another vehicle by the delayed time.

Such position correction may be calculated in consideration of an amount of change in position of another vehicle over time based on GPS information. To this end, vehicle information of the V2X message and the CAN message received from the MEC server may be used.

Use of Received Data

A vehicle that has received the V2X message or the CAN message from the MEC server may perform following operations using the V2X message or the CAN message.

1. Non-Autonomous Vehicle

Information of another vehicle may be delivered to APPs of AVN (Audio, Video, Navigation) systems mounted on the non-autonomous vehicles. To this end, the AVN system may be equipped with software that may send and receive a Message from the MEC server.

When a Standard CAN message is received via the transmission/reception software, values of Identification item and Value for executing the APP in the Standard CAN message are transmitted to the APPs. The APP of the AVN system may utilize the information of another vehicle thus obtained. For example, a navigation APP may display the information of another vehicle on a navigation display. Further, a danger signal detection APP may detect speed/break/blinker information of surrounding vehicles and display a warning message to the user.

2. Autonomous Vehicle

The autonomous vehicle may receive information of the non-autonomous vehicle as well as information of another autonomous vehicle.

The MEC server may send the V2X messages via Broadcast. All APPs (e.g., Navigation APP, Danger Detection Notification APP, or the like) that may use the V2X message in the autonomous vehicle may display the received information of another vehicle.

In the present disclosure, the non-autonomous vehicle may transmit Data to the MEC server using LTE USIM or the like for a service such as E-Call or the like.

Figure 20:
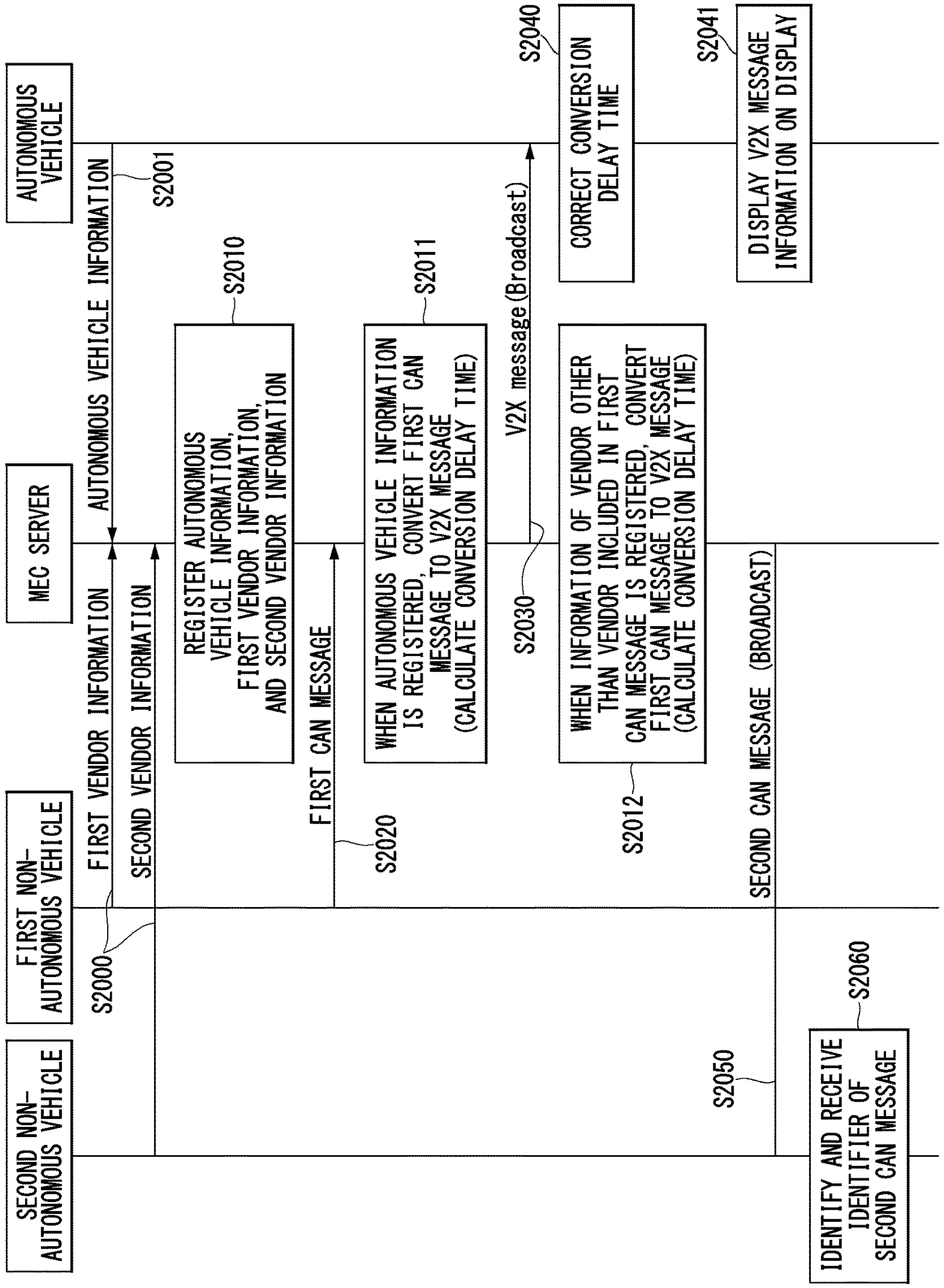
FIG. 20 is an embodiment to which the present disclosure may be applied.

FIG. 20 is an embodiment to which the present disclosure may be applied.

A first non-autonomous vehicle and a second non-autonomous vehicle respectively transmit Vendor information thereof to the MEC server (S2000).

The autonomous vehicle transmits autonomous vehicle information to the MEC server (S2001).

The MEC server registers the autonomous vehicle information and the Vendor information of the non-autonomous vehicles in the communication region of the MEC server (S2010).

The first non-autonomous vehicle transmits a first CAN message (S2020).

The MEC server receives the first CAN message, and, when the autonomous vehicle information is registered, converts the first CAN message to a V2X message including information of the first CAN message (S2011).

The MEC server transmits the V2X message via the Broadcast (S2030).

The autonomous vehicle that has received the V2X message from the MEC server may correct the conversion delay time (S2040).

The autonomous vehicle may display information of the received V2X message on the display (S2041).

The MEC server converts the first CAN message into a second CAN message based on the registered vendor information when information of a vendor other than a Vendor of the first CAN message is registered (S2012). That is, since the MEC server that has received the first CAN message may determine that the first non-autonomous vehicle transmitted the first CAN message has first Vendor information and there is second Vendor information registered in the MEC server, a second CAN message may be generated based on the second Vendor information of the second non-autonomous vehicle.

The MEC server may transmit the second CAN message via the broadcast (S2050).

The second non-autonomous vehicle determines an identifier of the second CAN message. When it is determined that the second non-autonomous vehicle indicates a vendor of the second non-autonomous vehicle, the second non-autonomous vehicle receives the identifier of the second CAN message (S2060).

The second non-autonomous vehicle may correct a conversion delay time of the second CAN message (S2061).

The second non-autonomous vehicle may display information of the second CAN message on the display (S2062).

Figure 21:
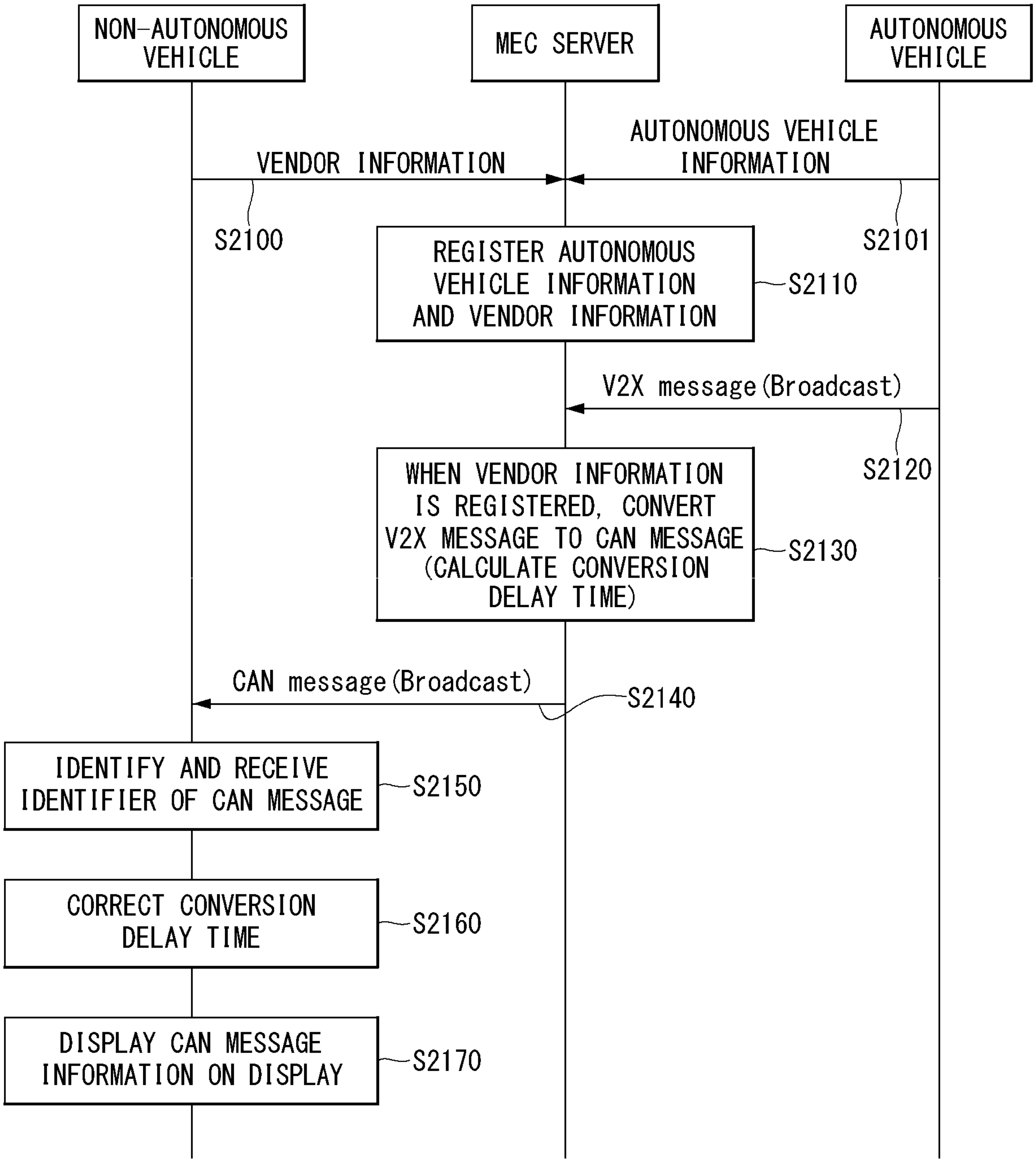
FIG. 21 is an embodiment to which the present disclosure may be applied.

FIG. 21 is an embodiment to which the present disclosure may be applied.

The non-autonomous vehicle transmits the vendor information thereof to the MEC server (S2100).

The autonomous vehicle transmits the autonomous vehicle information thereof to the MEC server (S2101).

The MEC server registers the received autonomous vehicle information and vendor information (S2110).

The autonomous vehicle transmits the V2X message via the broadcast (S2120).

The MEC server may convert the V2X message into the CAN message based on the registered vendor information and calculate the conversion delay time (S2130).

The MEC server transmits the converted CAN message via the broadcast (S2140).

The non-autonomous vehicle determines an identifier of the CAN message. When it is determined that the non-autonomous vehicle indicates a vendor of the non-autonomous vehicle, the non-autonomous vehicle receives the identifier of the CAN message (S2150).

The non-autonomous vehicle may correct the conversion delay time of the CAN message (S2160).

The non-autonomous vehicle displays information of the CAN message on the display (S2170).

Figure 22:
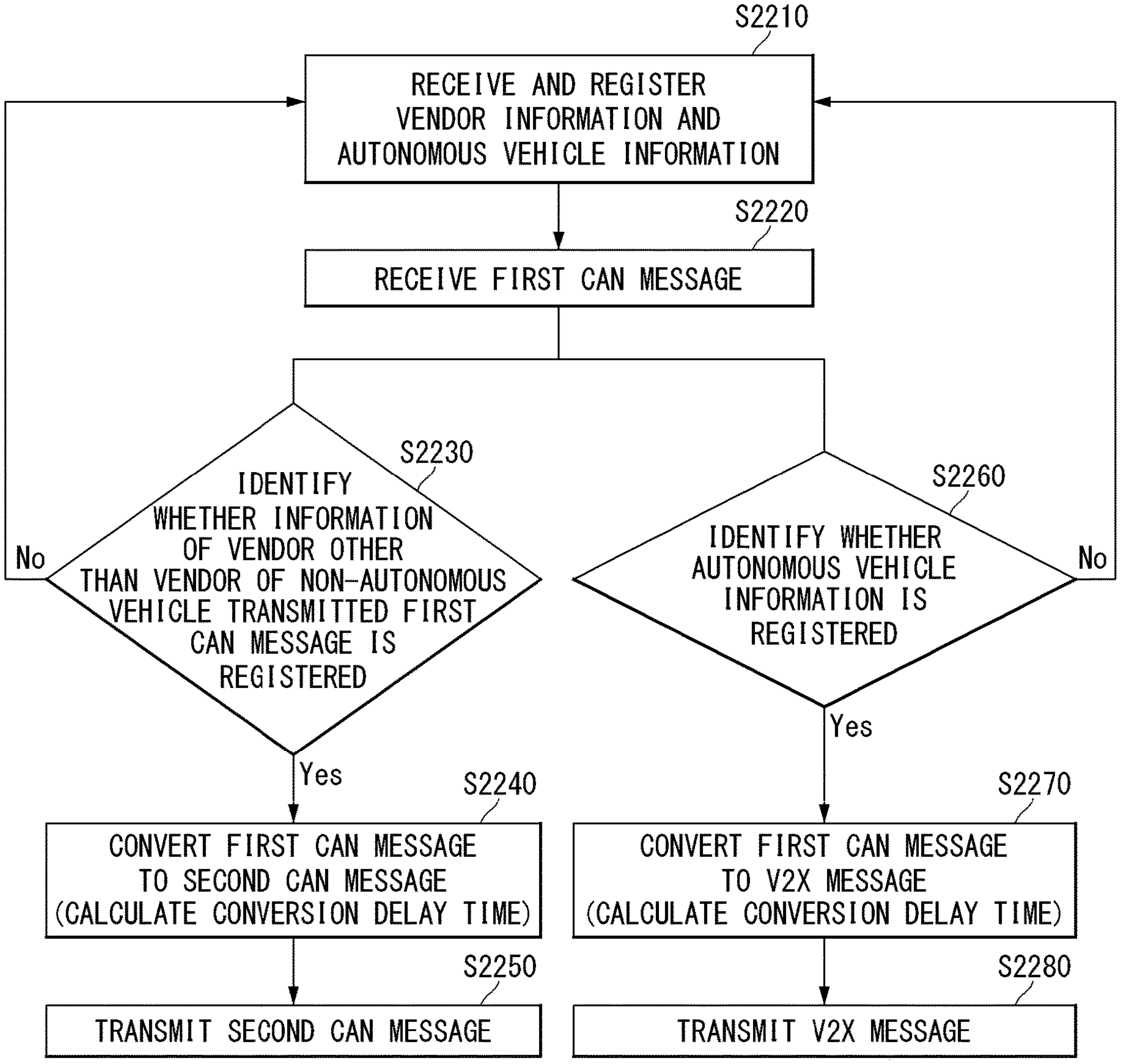
FIG. 22 is an embodiment of a MEC server to which the present disclosure may be applied.

FIG. 22 is an embodiment of a MEC server to which the present disclosure may be applied.

The MEC server receives the vendor information, receives the autonomous vehicle information, and registers the received vendor information and the autonomous vehicle information. Such registration information may be periodically updated and managed on a memory (S2210).

The MEC server receives the first CAN message (S2220).

The MEC server may identify the vendor of the non-autonomous vehicle transmitted the first CAN message through the first CAN message and determine whether information of a vendor other than the vendor of the non-autonomous vehicle is registered based on the vendor of the non-autonomous vehicle (S2230).

When there is the vendor information, the first CAN message is converted, based on the vendor information, into the second CAN message such that another non-autonomous vehicle may receive the same (S2240).

The converted second CAN message may be transmitted via the broadcast (S2250).

In addition, the MEC server may determine whether the autonomous vehicle information is registered (S2260).

When the autonomous vehicle information is registered, the first CAN message is converted into the V2X message such that the autonomous vehicle may receive the same (S2270).

The converted V2X message may be transmitted via the broadcast (S2280).

Devices to which the present disclosure may be applied

Figure 23:
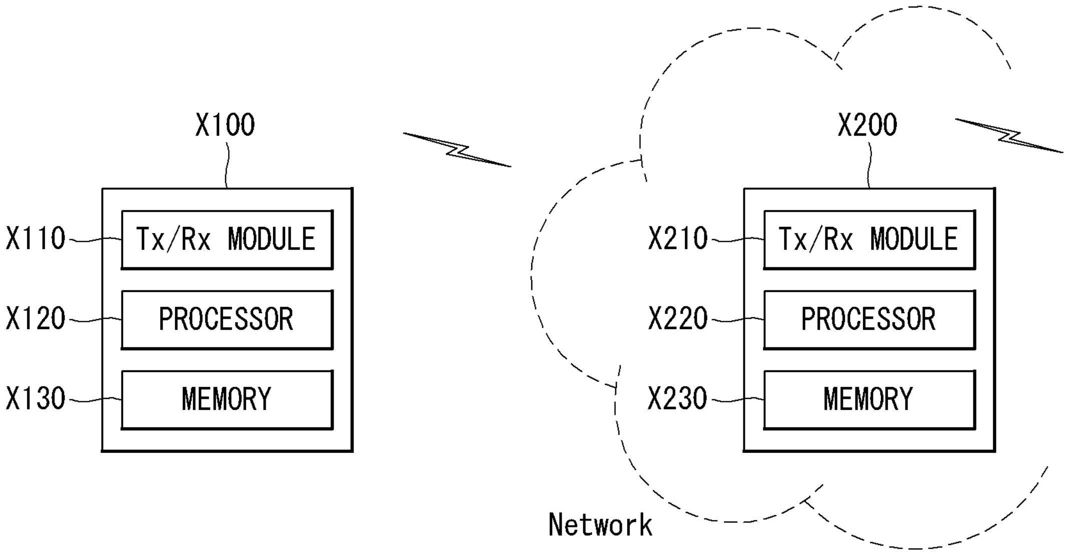
FIG. 23 is a block diagram of devices to which the present disclosure may be applied.

Referring to FIG. 23, a server X200 according to a proposed embodiment may be a MEC server or a cloud server, and may include a communication module X210, a processor X220, and a memory X230. The communication module X210 may also be referred to as a radio frequency (RF) unit. The communication module X210 may be configured to transmit various signals, data, and information to an external device and receive various signals, data, and information from the external device. The server X200 may be connected to the external device wiredly and/or wirelessly. The communication module X210 may be implemented by being separated into a transmitter and a receiver. The processor X220 may control overall operations of the server X200, and may be configured to perform a function of arithmetically processing information or the like to be transmitted and received with the external device. In addition, the processor X220 may be configured to perform a server operation proposed in the present disclosure. The processor X220 may control the communication module X210 to transmit data or a message to the UE, another vehicle, or another server based on the proposal of the present disclosure. The memory X230 may store the arithmetically processed information or the like for a predetermined time and may be replaced with a component such as a buffer or the like.

In addition, specific configurations of a terminal device (X100) and the server (X200) as described above may be implemented such that the details described in the various embodiments of the present disclosure described above are applied independently or at least two embodiments are applied at the same time, and duplicate content is omitted for clarity.

Embodiments to which the Present Disclosure May be Applied

Embodiment 1

A method for sharing data using a mobile edge computing (MEC) server in an autonomous driving system, the method comprising:

receiving a first controller area network (CAN) message from a first vehicle;

generating a V2X message including information of the first CAN message when autonomous vehicle information is registered in the MEC server; and transmitting the V2X message to an autonomous vehicle connected to the MEC server via broadcast.

Embodiment 2

The method of Embodiment 1, further comprising:

generating a second CAN message including the information of the first CAN message when information of a vendor other than a vendor of the first vehicle is registered in the MEC server; and transmitting the second CAN message to a second vehicle associated with the vendor information via the broadcast, wherein the second CAN message is associated with the vendor information.

Embodiment 3

The method of Embodiment 1, further comprising:

receiving the autonomous vehicle information from the autonomous vehicle; and registering the autonomous vehicle information.

Embodiment 4

The method of Embodiment 2, further comprising:

receiving vendor information of the second vehicle from the second vehicle; and registering the vendor information of the second vehicle.

Embodiment 5

The method of Embodiment 1, wherein the V2X message includes a value of a time at which the first CAN message is received.

Embodiment 6

The method of Embodiment 2, wherein the second CAN message includes a value of a time at which the first CAN message is received.

Embodiment 7

The method of Embodiment 5, wherein the autonomous vehicle corrects position information included in the V2X message based on the value of the time.

Embodiment 8

The method of Embodiment 6, wherein the second vehicle corrects position information included in the second CAN message based on the value of the time.

Embodiment 9

A method for sharing data using a mobile edge computing (MEC) server in an autonomous driving system, the method comprising:

receiving a V2X message from an autonomous vehicle;

generating a controller area network (CAN) message including information of the V2X message when vendor information of a vehicle is registered in the MEC server; and transmitting the CAN message to the vehicle connected to the MEC server via broadcast.

Embodiment 10

The method of Embodiment 9, further comprising:

receiving the vendor information of the vehicle from the vehicle; and registering the vendor information of the vehicle.

Embodiment 11

The method of Embodiment 9, wherein the CAN message includes a value of a time at which the V2X message is generated.

Embodiment 12

The method of Embodiment 11, wherein the vehicle corrects a position of the autonomous vehicle based on the value of the time.

Embodiment 13

A mobile edge computing (MEC) server for sharing data in an autonomous driving system, the MEC server comprising:

a communication module;

a memory; and a processor, wherein the processor is configured to:

receive a first controller area network (CAN) message from a first vehicle via the communication module;

generate a V2X message including information of the first CAN message when autonomous vehicle information is registered in the memory; and transmit the V2X message to an autonomous vehicle connected to the MEC server via broadcast via the communication module.

Embodiment 14

The MEC server of Embodiment 13, wherein the processor is configured to:

generate a second CAN message including the information of the first CAN message when information of a vendor other than a vendor of the first vehicle is registered in the memory;

and transmit the second CAN message to a second vehicle associated with the vendor information via the broadcast via the communication module, wherein the second CAN message is associated with the vendor information.

Embodiment 15

The MEC server of Embodiment 13, wherein the processor is configured to:

receive the autonomous vehicle information from the autonomous vehicle via the communication module; and register the autonomous vehicle information in the memory.

Embodiment 16

The MEC server of Embodiment 14, wherein the processor is configured to:

receive vendor information of the second vehicle from the second vehicle via the communication module; and register the vendor information of the second vehicle in the memory.

Embodiment 17

The MEC server of Embodiment 13, wherein the V2X message includes a value of a time at which the first CAN message is received.

Embodiment 18

The MEC server of Embodiment 14, wherein the second CAN message includes a value of a time at which the first CAN message is received.

Embodiment 19

The MEC server of Embodiment 17, wherein the autonomous vehicle corrects position information included in the V2X message based on the value of the time.

Embodiment 20

The MEC server of Embodiment 18, wherein the second vehicle corrects position information included in the second CAN message based on the value of the time.

The present disclosure described above may be embodied as computer-readable code on a medium on which a program is recorded. A computer-readable medium includes all kinds of recording devices in which data that may be read by a computer system is stored. Examples of the computer-readable media include a hard disk drive (HDD), a solid state disk (SSD), a silicon disk drive (SDD), a ROM, a RAM, a CD-ROM, a magnetic tape, a floppy disk, an optical data storage device, and the like. Further, the computer-readable media may include an implementation in a form of a carrier wave (e.g., transmission through Internet). Accordingly, the above detailed description should not be construed as limiting in all aspects and should be considered as illustrative. The scope of the present disclosure should be determined by reasonable interpretation of the appended claims and all changes that fall within the equivalent scope of the present disclosure are included in the present disclosure.

Further, the above description has been made mainly based on the embodiments, which are merely illustrative and do not limit the present disclosure. Various modifications and changes may be made by those skilled in the art without departing from the essential characteristics of the present disclosure. For example, each component specifically shown in the embodiments may be modified. Further, differences related to such modifications and applications should be construed as being included in the scope of the present disclosure as defined in the appended claims.

Although the present disclosure has been described mainly based on an example applied to an autonomous driving system (Automated Vehicle & Highway Systems) based on a 5G (5 generation) system, the present disclosure may be applied to various wireless communication system and autonomous driving devices in addition thereto.

What is claimed is:

1. A method for sharing data using a mobile edge computing (MEC) server in an autonomous driving system, the method comprising:
- receiving a first controller area network (CAN) message from a first vehicle;
- generating a vehicle-to-everything (V2X) message including information of the first CAN message, based on autonomous vehicle information being registered in the MEC server;
- transmitting, via broadcast, the V2X message to an autonomous vehicle connected to the MEC server;
- generating a second CAN message including the information of the first CAN message, based on vendor information of a vendor other than a vendor of the first vehicle being registered in the MEC server; and
- transmitting, via the broadcast, the second CAN message to a second vehicle associated with the vendor information,
- wherein the second CAN message is associated with the vendor information.

2. The method of claim 1, further comprising:
- receiving the vendor information of the second vehicle from the second vehicle; and
- registering the vendor information of the second vehicle.

3. The method of claim 1, further comprising:
- receiving the autonomous vehicle information from the autonomous vehicle; and
- registering the autonomous vehicle information.

4. The method of claim 1, wherein the V2X message includes a value of a time at which the first CAN message is received.

5. The method of claim 4, wherein the autonomous vehicle corrects position information included in the V2X message based on the value of the time at which the first CAN message is received.

6. The method of claim 1, wherein the second CAN message includes a value of a time at which the first CAN message is received.

7. The method of claim 6, wherein the second vehicle corrects position information included in the second CAN message based on the value of the time at which the first CAN message is received.

8. A method for sharing data using a mobile edge computing (MEC) server in an autonomous driving system, the method comprising:
- receiving a vehicle-to-everything (V2X) message from an autonomous vehicle;
- receiving, from a first vehicle, vendor information of the first vehicle;
- registering the vendor information of the first vehicle;
- generating a controller area network (CAN) message including information of the V2X message, based on the vendor information of the first vehicle being registered in the MEC server; and
- transmitting, via broadcast, the CAN message to the first vehicle connected to the MEC server.

9. The method of claim 8, wherein the CAN message includes a value of a time at which the V2X message is generated.

10. The method of claim 9, wherein the first vehicle corrects a position of the autonomous vehicle based on the value of the time at which the V2X message is generated.

11. A mobile edge computing (MEC) server configured to share data in an autonomous driving system, the MEC server comprising:
- a transceiver;
- a memory; and
- a processor,
- wherein the processor is configured to:
  - receive a first controller area network (CAN) message from a first vehicle via the transceiver;
  - generate a vehicle-to-everything (V2X) message including information of the first CAN message, based on autonomous vehicle information being registered in the memory;
  - transmit, via broadcast via the transceiver, the V2X message to an autonomous vehicle connected to the MEC server;
  - generate a second CAN message including the information of the first CAN message, based on vendor information of a vendor other than a vendor of the first vehicle being registered in the MEC server; and
  - transmit, via the broadcast via the transceiver, the second CAN message to a second vehicle associated with the vendor information,
  - wherein the second CAN message is associated with the vendor information.

12. The MEC server of claim 11, wherein the processor is configured to:
- receive the vendor information of the second vehicle from the second vehicle via the transceiver; and
- register the vendor information of the second vehicle in the memory.

13. The MEC server of claim 11, wherein the processor is configured to:
- receive the autonomous vehicle information from the autonomous vehicle via the transceiver; and
- register the autonomous vehicle information in the memory.

14. The MEC server of claim 11, wherein the V2X message includes a value of a time at which the first CAN message is received.

15. The MEC server of claim 14, wherein the autonomous vehicle corrects position information included in the V2X message based on the value of the time at which the first CAN message is received.

16. The MEC server of claim 11, wherein the second CAN message includes a value of a time at which the first CAN message is received.

17. The MEC server of claim 16, wherein the second vehicle corrects position information included in the second CAN message based on the value of the time at which the first CAN message is received.

* * * * *